United States Patent
Ogino et al.

(10) Patent No.: US 6,864,910 B1
(45) Date of Patent: Mar. 8, 2005

(54) OPTICAL APPARATUS

(75) Inventors: Shigeru Ogino, Tokyo (JP); Kenji Miyauchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 835 days.

(21) Appl. No.: 09/603,606

(22) Filed: Jun. 26, 2000

(30) Foreign Application Priority Data

| Jun. 30, 1999 | (JP) | 11-186295 |
|---|---|---|
| Jun. 30, 1999 | (JP) | 11-186296 |
| Jun. 30, 1999 | (JP) | 11-186297 |
| Jun. 30, 1999 | (JP) | 11-186298 |

(51) Int. Cl.[7] .................................... H04N 15/00
(52) U.S. Cl. .................... 348/42; 396/331; 382/154
(58) Field of Search ................ 348/42, 43, 47, 348/49, 51, 52, 54; 382/154; 396/331, 109; 356/12; 352/62

(56) References Cited

U.S. PATENT DOCUMENTS

| 3,622,242 A | * | 11/1971 | Land et al. .................... 356/12 |
| 3,990,087 A | * | 11/1976 | Marks et al. ................ 396/331 |
| 4,178,090 A | * | 12/1979 | Marks et al. ................ 396/331 |
| 4,678,298 A | * | 7/1987 | Perisic ........................ 352/62 |
| 5,761,549 A | * | 6/1998 | Utagawa ..................... 396/109 |
| 5,883,662 A | * | 3/1999 | Zanen ......................... 348/49 |
| 6,549,650 B1 | * | 4/2003 | Ishikawa et al. ............ 382/154 |

* cited by examiner

Primary Examiner—Gims Philippe
(74) Attorney, Agent, or Firm—Cowen, Liebowitz & Latman, P.C.

(57) ABSTRACT

An optical apparatus is arranged to automatically control, on the basis of an object distance, a convergence distance of right and left optical systems arranged to cause right and left optical images having a predetermined amount of parallax to enter a photographing optical system, and has a plurality of modes in which a difference between the convergence distance and the object distance varies.

56 Claims, 15 Drawing Sheets

OPTICAL APPARATUS

BACKGROUND OF THE INVENTION

1. Field of the Invention

The present invention relates to an image pickup apparatus and an optical apparatus arranged to pick up right and left parallactic images.

2. Description of Related Art

In recent years, a variety of stereoscopic video display apparatuses have been proposed for stereoscopically displaying video images picked up by an image pickup apparatus, such as a video camera or an electronic still camera. Heretofore, there is known a stereoscopic video display apparatus in which right and left parallactic images are displayed on a monitor and are observed by the observer with liquid-crystal shutter spectacles. In such a stereoscopic video display apparatus, the states of right and left liquid crystal elements of the liquid-crystal shutter spectacles are synchronized with a video signal, so that, when a video image for the right eye and a video image for the left eye are alternately displayed on the monitor, the observer is enabled to view a video image for the right eye always with the right eye and a video image for the left eye always with the left eye. Accordingly, a video image giving a sensation of depth is observed by the observer.

More specifically, during the period when a video image for the right eye is being displayed on the monitor, the right liquid crystal element is set to a transmissive state and the left liquid crystal element is set to a non-transmissive state, while, during the period when a video image for the left eye is being displayed on the monitor, the right liquid crystal element is set to a non-transmissive state and the left liquid crystal element is set to a transmissive state.

Further, in recent years, a display of the head-mounted type or the spectacle type, i.e., the so-called head-mounted display, has been developed. In the head-mounted display, too, video images for the right eye and for the left eye are selectively displayed for the right eye and the left eye, respectively, so that the observer is enabled to view a stereoscopic video image giving a sensation of depth.

In addition, there has been proposed an arrangement in which a liquid crystal display is combined with a lenticular sheet having minute lenses of a predetermined pitch or with a mask having a predetermined pattern of aperture parts and non-aperture parts. In such an arrangement, light beams from the liquid crystal display are made to have directivity, and the directivity is made to match with a video image pattern displayed on the liquid crystal display, so that a video image for the right eye is observed with the right eye and a video image for the left eye is observed with the left eye, thereby enabling the observer to view a video image giving a sensation of depth.

Heretofore, it is general that the above-mentioned images to be displayed are picked up by the twin-lens type stereoscopic camera having two lenses. In addition, there has been proposed a camera which does not require two lenses (a photographing apparatus for stereoscopic television disclosed in Japanese Patent Publication No. Hei 8-27499). This camera has two liquid-crystal shutters, a total-reflection mirror and a half-reflection mirror, and is arranged to pick up right and left parallactic images alternately through one lens.

Further, in the case of the twin-lens type stereoscopic camera, the so-called convergence adjustment for adjusting the parallax of right and left images during photographing is required for the lenses for time-divisionally picking up right and left video images. Heretofore, in general, the convergence adjustment is performed manually.

However, since, in the case of the above-mentioned conventional twin-lens type stereoscopic camera, a video image for the right eye and a video image for the left eye are picked up for the respective lenses, if the difference between the two lenses in performance, such as magnification, deviation of an optical axis, color, brightness, distortion, field tilt or the like, occurs due to the manufacturing error of lenses, the observer tends to feel tired in viewing a stereoscopic video image, or two images tend to be unable to fuse with each other. Accordingly, it is necessary to heighten the accuracy of parts so as to match the performance of one lens with that of the other lens, or it is necessary to make the adjustment of parts if the increased accuracy of parts is still insufficient. Further, in order to absorb the difference in performance, it is necessary to take special measures, such as an electrical correction of images.

Further, in a case where zoom lenses are used in the twin-lens type stereoscopic camera, the magnification varying actions of two, right and left, lenses are required to interlock with each other during zooming with the performance of each lens adjusted. Therefore, the twin-lens type stereoscopic camera having zoom lenses necessitates high cost and a time-consuming job for manufacturing and has low mass-productivity.

In addition, two monitors are naturally needed for observing video images picked up by the twin-lens type stereoscopic camera, so that the practicability thereof is little. Further, if such two images are to be recorded, it becomes necessary to record two video signals in the state of being synchronized with each other. Therefore, a special recording apparatus is needed.

Further, in order to avoid this arrangement, it is conceivable to convert two video signals into one video signal. However, for that purpose, there is needed a special converter for use in displaying and recording right and left parallactic images alternately.

Accordingly, the twin-lens type stereoscopic camera has a large camera body as compared with that of the ordinary single-lens camera, and the whole system thereof necessitates a special apparatus, as mentioned in the foregoing. Therefore, the twin-lens type stereoscopic camera is large in size, is expensive, and has low mobility, so that it has been difficult to widely spread the twin-lens type stereoscopic camera.

On the other hand, the camera proposed in Japanese Patent Publication No. Hei 8-274999 has such a problem that, since optical paths of right and left parallactic images are combined by the half-reflection mirror to be lead to the lens, the amount of light of an image incident on the lens after being transmitted or reflected by the half-reflection mirror becomes half. Further, in the construction of this camera, theoretically, the optical path lengths of right and left parallactic images are different from each other, so that a difference in magnification between the right and left parallactic images would occur. This causes the fatigue of the observer in observing a video image picked up by the above-mentioned camera, or makes it impossible for two images to fuse with each other for a stereoscopic viewing.

BRIEF SUMMARY OF THE INVENTION

It is, therefore, an object of the invention to provide an image pickup apparatus which is small in size, low in cost and excellent in mobility and expandability and is capable of picking up a high-definition stereoscopic video image, and a convergence-distance deciding method, a storage medium and an optical apparatus for the image pickup apparatus.

It is another object of the invention to provide an image pickup apparatus in which the convergence control is automatically performed so as to lighten the burden imposed on the photographer during photographing and pick up a natural stereoscopic video image, and a convergence-distance deciding method, a storage medium and an optical apparatus for the image pickup apparatus.

To attain the above objects, in accordance with an aspect of the invention, there is provided an optical apparatus or an image pickup apparatus, which comprises image pickup means for picking up an image of an object, an optical system arranged to cause the image to be formed on the image pickup means, a pair of shutters disposed symmetrically with respect to an optical axis of the optical system and arranged to time-divisionally transmit right and left parallactic images of the object, a pair of mirrors disposed symmetrically with respect to the optical axis of the optical system and arranged to respectively reflect and lead to the optical system the right and left parallactic images transmitted by the pair of shutters, object-distance information detecting means for detecting an object distance indicative of a distance to the object, convergence-distance deciding means for deciding, on the basis of the detected object distance, a convergence distance indicative of a distance to an intersection point of optical axes defined by the pair of mirrors, and driving means for driving the pair of mirrors in such a way as to attain the decided convergence distance.

In accordance with another aspect of the invention, there is provided an optical apparatus or an image pickup apparatus which is capable of most suitably controlling the convergence distance in dependence upon a display.

In accordance with a further aspect of the invention, there is provided an optical apparatus or an image pickup apparatus which is capable of smoothly and quickly changing over between a two-dimensional display and a three-dimensional display.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Each of the preferred embodiments of the invention is applied to an interchangeable-lens type stereoscopic video photographing apparatus serving as an image pickup apparatus or an optical apparatus.

Figure 1:
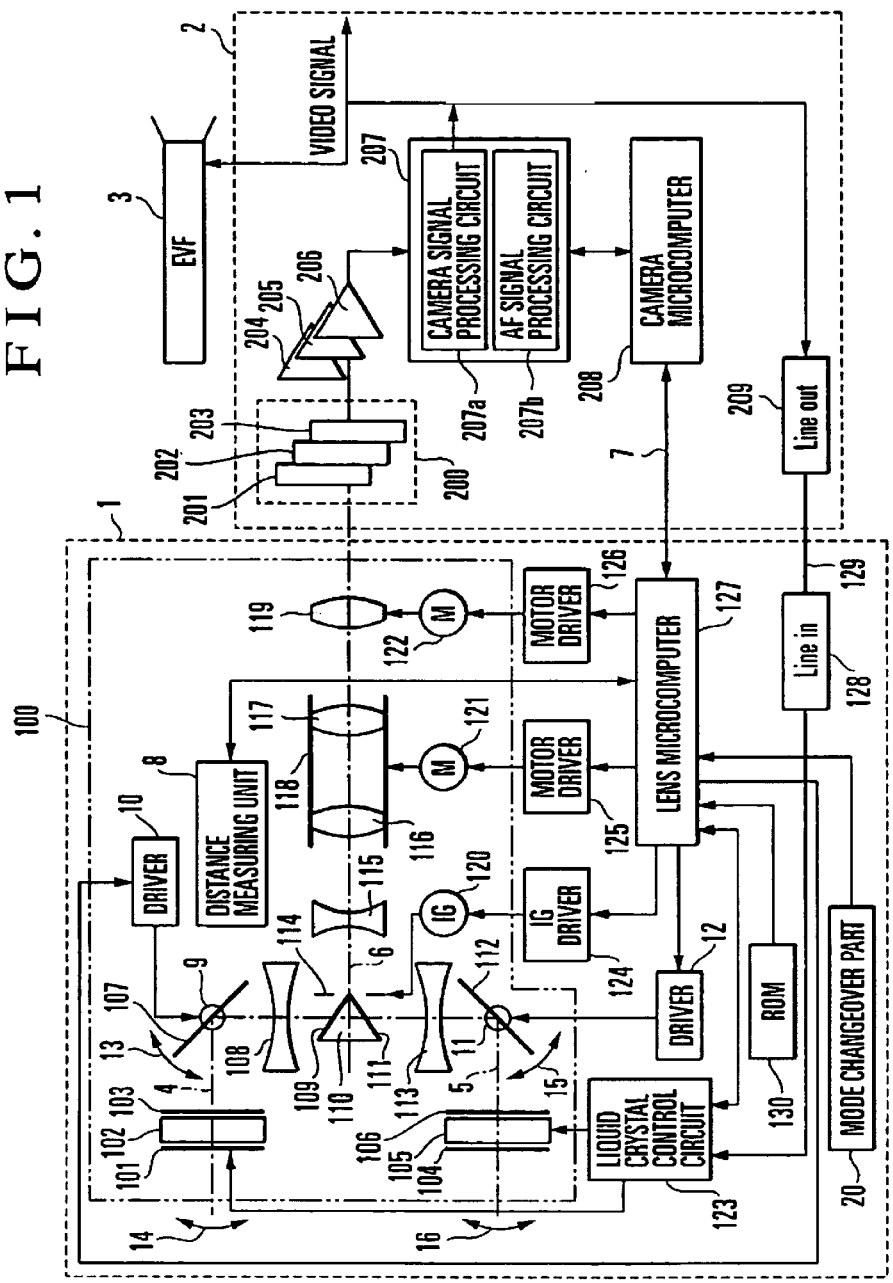
FIG. 1 is a block diagram showing the basic construction of a stereoscopic video photographing apparatus according to a first embodiment of the invention.

FIG. 1 is a block diagram showing the basic construction of a stereoscopic video photographing apparatus according to a first embodiment of the invention. Referring to FIG. 1, an interchangeable lens unit (hereinafter, simply referred to as a lens unit) 1 includes a photographing optical system 100, a liquid crystal control circuit 123, an IG driver 124, motor drivers 125 and 126, a lens microcomputer 127 for controlling these elements, a video input terminal (Line in) 128, a mode changeover part 20, a ROM 130, a standardized lens mount (not shown), and a contact block (not shown).

A camera body 2 includes a three-plate (RGB) type image pickup part 200, amplifiers 204, 205 and 206 connected correspondingly with image pickup elements 201, 202 and 203 constituting the image pickup part 200, a signal processing circuit 207 connected to the amplifiers 204, 205 and 206, a camera microcomputer 208 connected to the signal processing circuit 207, a zoom switch and an AF switch (both not shown) connected to the camera microcomputer 208, a video output terminal (Line out) 209, an electronic viewfinder (EVF) 3, a standardized camera mount (not shown), and a contact block (not shown).

The camera mount of the camera body 2 has such a construction as to be capable of being attached to the lens mount of the lens unit 1. When the lens mount is mounted on the camera mount, the contact block of the lens unit 1 and the contact block of the camera body 2 come into contact with each other, so that control signals can be exchanged between the lens microcomputer 127 and the camera microcomputer 208, as indicated by an arrow 7 in FIG. 1.

More specifically, predetermined data communication is performed between the lens microcomputer 127 and the camera microcomputer 208 in accordance with a predetermined protocol. Further, the supply of electric power from the camera body 2 to the lens unit 1 is performed through the contact blocks of the camera body 2 and the lens unit 1.

In the photographing optical system 100, total-reflection mirrors 107 and 112, which are rotatable around the respective predetermined axes, are arranged to be driven by driving parts 9 and 11, respectively. In the case of the first embodiment, stepping motors are employed as the driving parts 9 and 11. Incidentally, the driving parts 9 and 11 are not limited to the stepping motors, and may be DC motors or ultrasonic motors.

Drivers 10 and 12 are arranged to receive control signals from the lens microcomputer 127 so as to send driving signals to the driving parts (stepping motors) 9 and 11, respectively. The lens microcomputer 127 detects the rotational angles of the stepping motors 9 and 11 by counting the numbers of step pulses sent to the stepping motors 9 and 11.

In a case where DC motors or ultrasonic motors are used as the driving parts 9 and 11, encoders for detecting the rotational angles of the mirrors 107 and 112 may be additionally provided to make it possible to detect the rotational angles of the mirrors 107 and 112.

Further, when the stepping motors 9 and 11 are driven, the mirrors 107 and 112 rotate around the respective predetermined axes, thereby varying the directions of the optical axes 4 and 5. In the first embodiment, the centers of rotation of the mirrors 107 and 112 respectively lie on the rotational axes which are straight lines passing through the intersection point between the optical axis 4 and the mirror 107 and the intersection point between the optical axis 5 and the mirror 112 and perpendicular to the plane of the drawing in FIG. 1, i.e., the vertical direction of a picture plane. Further, the optical axes 4 and 5 for the right and left images are placed almost on one and the same plane, and almost intersect (hereinafter referred to as "converge") at predetermined positions including an infinitely distant point.

As mentioned in the foregoing, the mirrors 107 and 112 are rotatable around the predetermined axes. Therefore, by rotating the mirrors 107 and 112, it is possible to vary a convergence position at which the optical axes 4 and 5 converge. For picking up a natural stereoscopic video image, it is necessary and indispensable to make the convergence position variable.

In addition, in the first embodiment, the interval between the intersection point between the optical axis 4 and the mirror 107 and the intersection point between the optical axis 5 and the mirror 112 (hereinafter referred to as the base length) is 63 mm or thereabout, although not being limited to this value. The interval of 63 mm or thereabout, which corresponds to the average pupil distance of a human being, is set for the purpose of picking up a natural stereoscopic video image.

Figure 2:
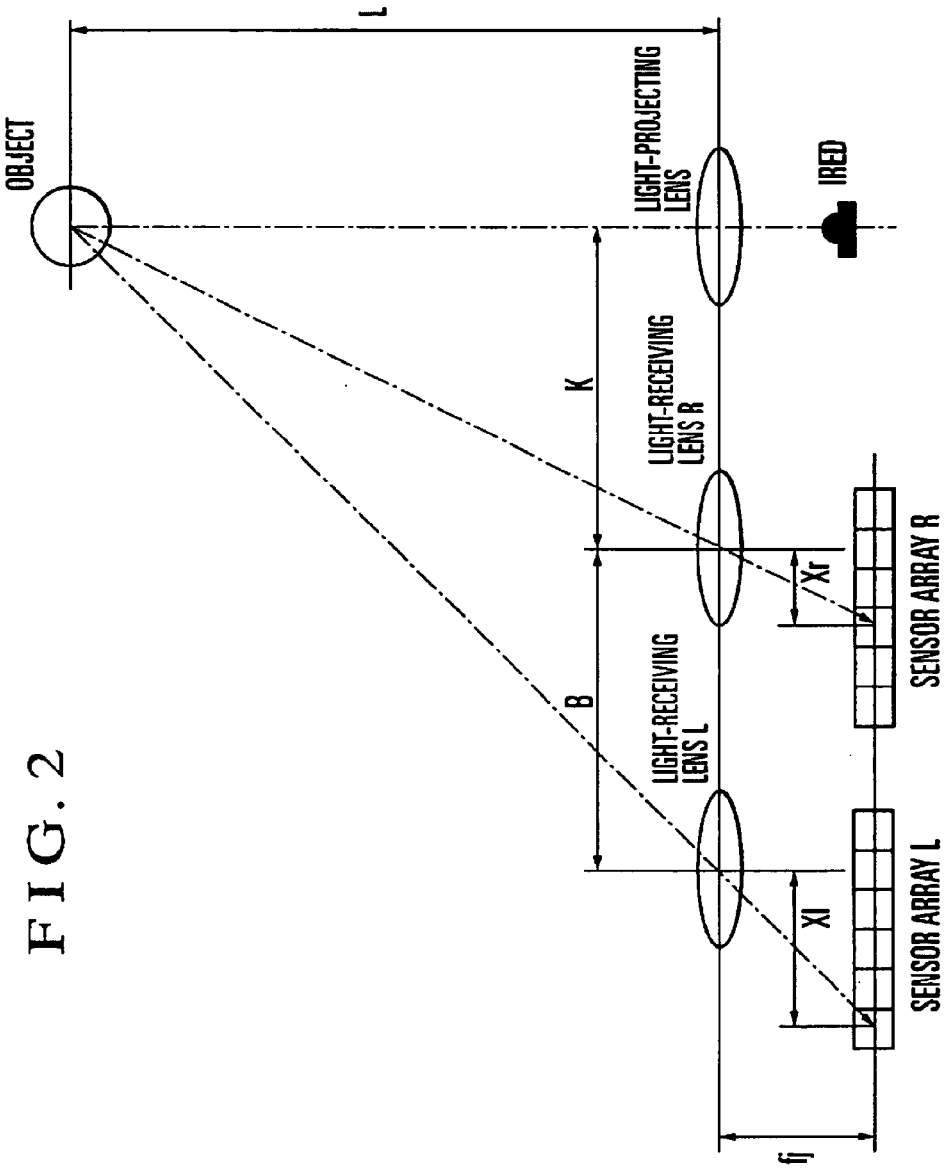
FIG. 2 is a diagram for explaining the principle of measurement by the trigonometric distance measuring method.

The lens unit 1 further includes an object distance detecting part (distance measuring unit) 8 arranged to measure a distance to the object by using a trigonometric distance measuring method. FIG. 2 is a diagram for explaining the principle of measurement by the trigonometric distance measuring method. The distance measuring unit 8 is composed of a light projection lens, light receiving lenses, an IRED serving as light-emitting means, line sensors (sensor arrays) each having a plurality of light receiving parts arrayed in a line-like fashion, and a computing part (not shown) for computing the object distance L on the basis of outputs of the line sensors.

Light emitted from the IRED is reflected by the object. The reflected light is collected by the light receiving lens L and the light receiving lens R to be imaged on the line sensor L and the line sensor R.

In this instance, portions of the line sensors at which the light is received are detected, so that the difference (Xl−Xr) between the respective portions is obtained. Then, the object distance L can be obtained by the computing part from the difference (Xl−Xr), a known focal length fj of each of the light receiving lenses L and R and a known interval (base length) B between the light receiving lenses L and R.

While, in the first embodiment, information on the object distance is computed according to the trigonometric distance measuring method, it is possible to obtain the object distance information from information on the positions of the respective lenses of the photographing optical system. This method may be of course employed.

The photographing optical system 100 further includes lens groups 108, 113 and 115 of negative refractive power each having one or a plurality of lens elements, lens groups 116, 117 and 119 of positive refractive power each having one or a plurality of lens elements, a prism 110 having total-reflection mirror surfaces 109 and 111, polarizing plates 101, 103, 104, 106, and liquid crystal elements 102 and 105 having a shutter function.

With the polarizing plates 101 and 103 combined with the liquid crystal element 102, when electric field is applied to the liquid crystal element 102, the combination of the polarizing plates 101 and 103 and the liquid crystal element 102 is brought into a transmissive state in which a light flux is allowed to pass or a non-transmissive state in which a light flux is prevented from passing. The other combination of the polarizing plates 104 and 106 and the liquid crystal element 105 operates in the similar way.

Incidentally, while, in the first embodiment, an FLC (ferroelectric liquid crystal display) is used as the liquid crystal element, a TN (twisted nematic liquid crystal display) or an STN (supertwisted nematic liquid crystal display) may be used instead.

Further, the polarizing plates 101 and 103 and the polarizing plates 104 and 106 may be fixed by adhesion to or may be separately disposed from the liquid crystal elements 102 and 105, respectively.

The photographing optical system 100 further includes an iris 114 serving as an amount-of-light adjusting means, which, in the first embodiment, is disposed relatively closer to the object side so as to reduce the effective light-flux diameter of a front lens member, an IG meter 120, and stepping motors 121 and 122. The lens groups 108, 113 and 115 are fixed lens groups. The lens group 116 is a variator lens. The lens group 117 is a compensator lens. The lens group 119 is a movable lens group having the focusing function.

In the first embodiment, the lens groups 116 and 117 are arranged to be movable in the optical axis direction in mechanical association with a cam tube 118. The cam tube 118 is arranged to be rotated by the stepping motor 121.

Incidentally, the driving method for the lens groups 116 and 117 is not limited to this arrangement. Instead, the lens groups 116 and 117 may be independently driven without using a cam tube.

Further, the lens group 119 is driven by the stepping motor 122. In addition, these driving sources are not limited to the stepping motors, but may be electromagnetic motors such as a DC motor, ultrasonic motors, electrostatic motors.

The respective positions in the optical axis direction of the lens groups 116, 117 and 119 are detected by counting the numbers of driving pulses used to drive the stepping motors 121 and 122 and converting the counted numbers into values indicative of the positions. Incidentally, the means for detecting the positions of the lens groups 116, 117 and 119 is not limited to the one for counting the number of driving pulses for the stepping motors 121 and 122, but may be the one of the variable-resistance type, of the electrostatic-capacitance type, or of the optical type such as a PSD (position detecting element) or an IRED (infrared light emitting diode).

The IG meter 120 is arranged to adjust the amount of light by driving the iris 114. Further, an ND (neutral-density) filter (not shown) is disposed within the photographing optical system 100. The zoom type of the photographing optical system 100 is a rear-focus zoom type. Thus, during zooming, the lens groups 116, 117 and 119 are controlled by the lens microcomputer 127 to be driven in a predetermined interlocking relation. Incidentally, the zoom type is not limited to such an arrangement.

Meanwhile, in the camera body 2, the signal processing circuit 207 includes a camera signal processing circuit 207a and an AF signal processing circuit 207b. The output of the camera signal processing circuit 207a is externally outputted as a video signal. The output of the camera microcomputer 208 is supplied to the lens microcomputer 127 of the lens unit 1.

In the three-plate type image pickup part 200, an incident light flux picked up by the photographing optical system 100 is separated into three original-color components by a first prism, a second prism and a third prism (color-separation prisms). Of the three original-color components, the red component is imaged on the image sensor 201, the green component is imaged on the image sensor 202, and the blue component is imaged on the image sensor 203. Object images thus-formed on the image sensors 201, 202 and 203 are photoelectrically converted into electrical signals, which are respectively supplied to the amplifiers 204, 205 and 206.

The electrical signals which have been respectively amplified to optimum levels by the amplifiers 204, 205 and 206 are converted into a television signal of the standard system by the camera signal processing circuit 207a. The television signal is externally outputted as a video signal, and, at the same time, is supplied to the AF signal processing circuit 207b.

The AF signal processing circuit 207b forms an AF evaluation value signal by using the three original-color video signals supplied from the amplifiers 204, 205 and 206. For example, the AF signal processing circuit 207b extracts and integrates high-frequency components of the video signals to obtain an AF evaluation signal, the level of which varies in accordance with the focusing state.

The camera microcomputer 208 reads out the AF evaluation value signal formed by the AF signal processing circuit 207b, by using a data reading program which has been stored beforehand, and transfers the readout AF evaluation value signal to the lens microcomputer 127. The lens microcomputer 127 performs a focusing action by driving and controlling the lens group 119 on the basis of the AF evaluation value signal as transferred.

Figure 3:
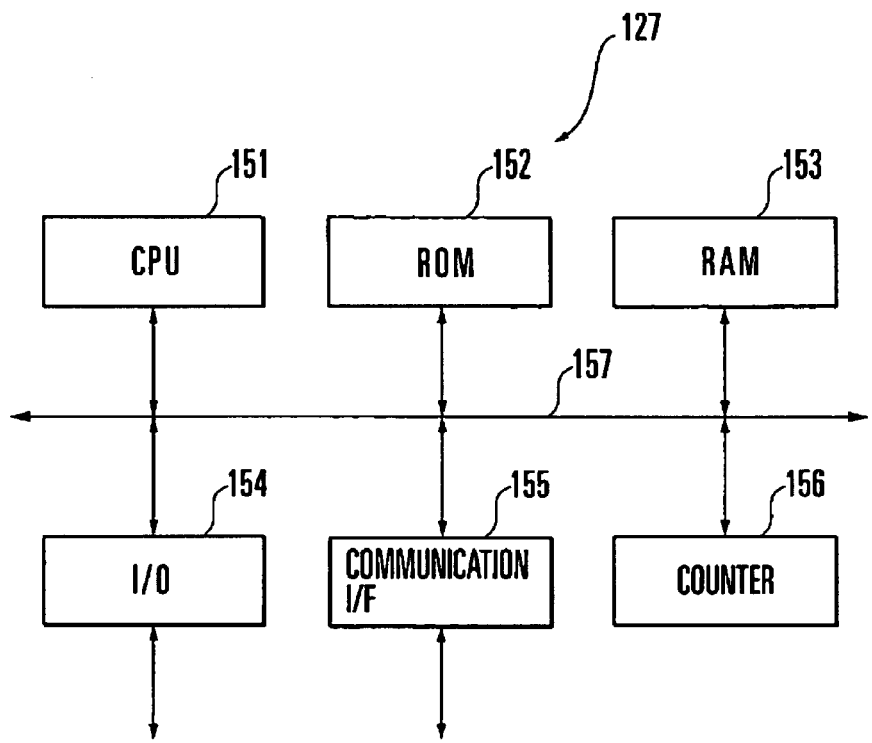
FIG. 3 is a block diagram showing the electrical arrangement of a lens microcomputer 127 in the stereoscopic video photographing apparatus shown in FIG. 1.

FIG. 3 is a block diagram showing the electrical arrangement of the lens microcomputer 127. The lens microcomputer 127 has such a construction that a CPU 151, a ROM 152, a RAM 153, an I/O interface (IF) 154, a communication IF 155, a counter 156, etc., are connected with one another through a bus 157.

Next, the operation of picking up right and left parallactic images by the image pickup part 200 will be described. The video output terminal 209 of the camera body 2 and the video input terminal 128 of the lens unit 1 are made to be connected to each other by the cable 129, so that a video signal obtained by the camera body 2 is supplied to the liquid crystal control circuit 123. Incidentally, mount contacts (not shown) between the lens unit 1 and the camera body 2 may be used as the cable 129.

Figure 4:
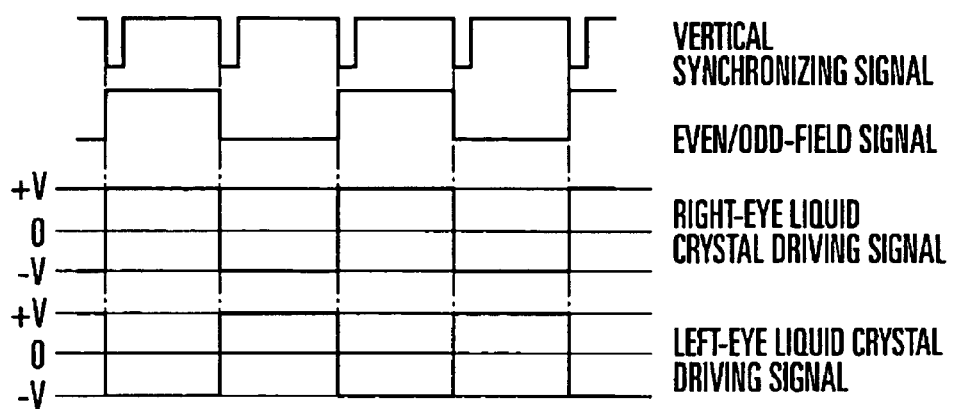
FIG. 4 is a timing chart showing the signal waveform of each part of a liquid crystal control circuit 123 in the stereoscopic video photographing apparatus shown in FIG. 1.
Figure 5:
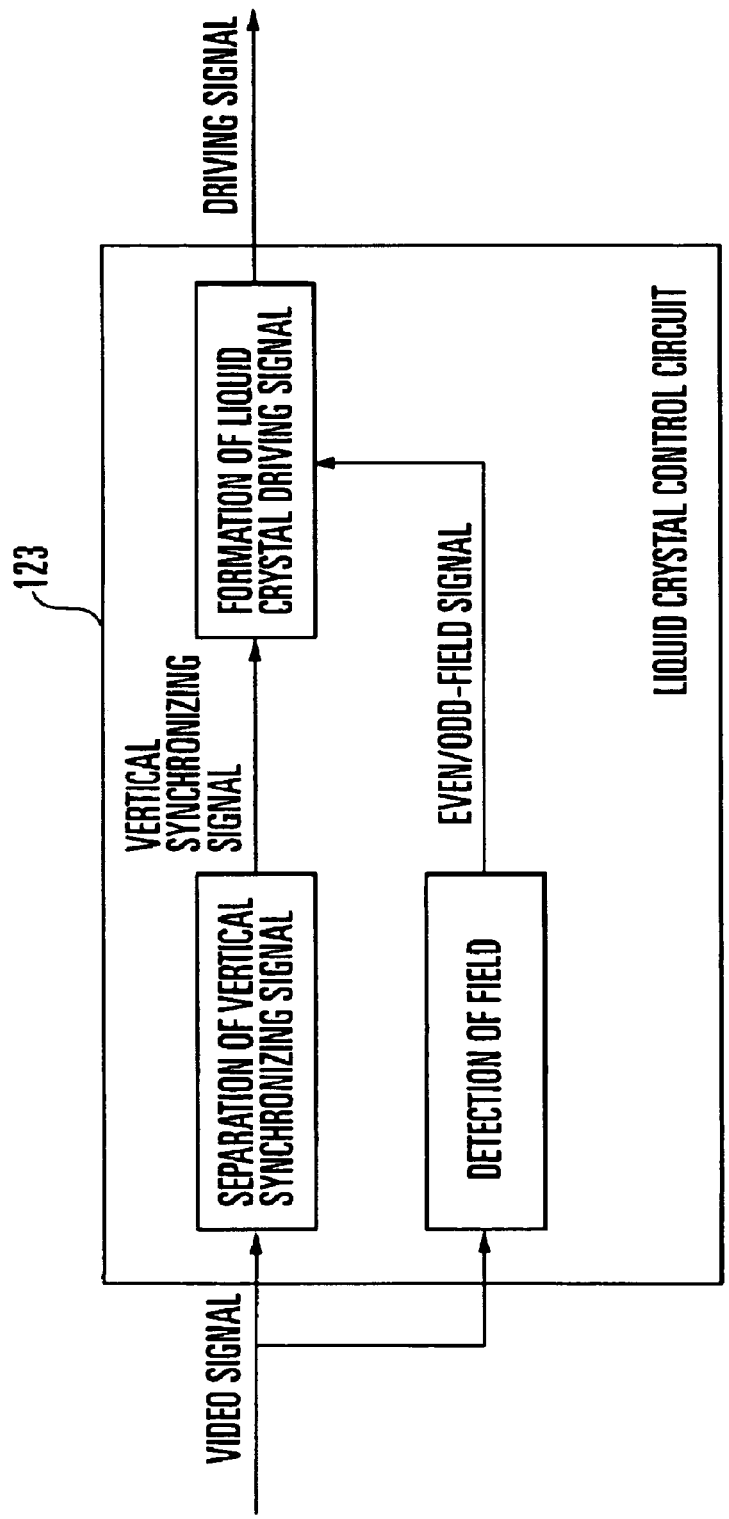
FIG. 5 is a block diagram showing the arrangement of the liquid crystal control circuit 123.

The video signal is an interlaced signal of the NTSC system. Accordingly, 60 fields of the video signal are outputted for one second. The video signal is subjected to synchronization by using a vertical synchronizing signal and a horizontal synchronizing signal. The vertical synchronizing signal is superposed on the forefront of each of 60 fields of the video signal. FIG. 4 is a timing chart showing the signal waveform of each part of the liquid crystal control circuit 123. FIG. 5 is a block diagram showing the arrangement of the liquid crystal control circuit 123.

In the liquid crystal control circuit 123, the vertical synchronizing signal, which appears at intervals of 1/60 second, is separated from the inputted video signal. Further, an odd/even-field signal for discriminating between an odd field and an even field is formed from the inputted video signal.

The discrimination between an odd field and an even field can be performed by finding whether the vertical synchronizing signal coincides with the edge of the horizontal synchronizing signal (i.e., an odd field) or lags behind the edge of the horizontal synchronizing signal as much as ½ H (H being a horizontal synchronizing period) (i.e., an even field).

Then, a right-eye liquid crystal driving signal and a left-eye liquid crystal driving signal are formed from the vertical synchronizing signal and the odd/even-field signal, and are outputted from the liquid crystal control circuit 123.

The right-eye liquid crystal driving signal and the left-eye liquid crystal driving signal are driving signals for causing the image pickup part (CCD) 200 to pick up right and left parallactic images alternately in a time-divisional manner. Thus, during a period of time when one of the right and left parallactic images is being picked up, one liquid crystal shutter associated with this parallactic image is brought into a transmissive state and the other liquid crystal shutter is brought into a non-transmissive state.

Referring to FIG. 4, assuming that the non-transmissive state occurs when the driving signal has a positive voltage and the transmissive state occurs when the driving signal has a negative voltage, the liquid crystal driving signals are supplied to the liquid crystal elements 102 and 105 in such a manner that the liquid crystal element for the left eye is in the transmissive state while the liquid crystal element for the right eye is in the non-transmissive state and the liquid crystal element for the left eye is in the non-transmissive state while the liquid crystal element for the right eye is in the transmissive state.

With the liquid crystal elements 102 and 105 alternately driven as described above, while the liquid crystal element 102 is in the non-transmissive state, a video image formed with a light flux having passed through the liquid crystal element 105 is picked up by the image pickup part (CCD) 200, and while the liquid crystal element 105 is in the non-transmissive state, a video image formed with a light flux having passed through the liquid crystal element 102 is picked up by the image pickup part (CCD) 200.

In the first embodiment, since there is the odd/even-field signal as information, a video signal for the left eye is provided for an odd field, and a video signal for the right eye is provided for an even field. With the above-described image pickup operation, a parallactic image for the right eye and a parallactic image for the left eye are alternately picked up by the image pickup part (CCD) 200 in such a manner that 60 images in total composed of 30 images for the right eye and 30 images for the left eye are picked up for one second.

Since the timing at which the signal reading is performed from the image pickup part (CCD) 200 is synchronized with the above-mentioned timing, a parallactic image for the right eye and a parallactic image for the left eye are alternately outputted as video signals from the signal processing circuit 207.

The method of separating a vertical synchronizing signal and the method of detecting a field are known in the art, and are not limited to the above-mentioned methods. Further, while, in the first embodiment, the cable 129 is used for inputting a video signal to the liquid crystal control circuit 123, information on the vertical synchronizing signal and information on the even/odd field may be communicated through data communication between the lens microcomputer 127 and the camera microcomputer 208.

Incidentally, while, in the case of FIG. 4, the rise and fall of the right-eye liquid crystal driving signal and the left-eye liquid crystal driving signal are made to coincide with each other in synchronism with the vertical synchronizing signal, the rise and fall of the right-eye liquid crystal driving signal and the left-eye liquid crystal driving signal may occur within the vertical retrace interval (20H) of a video signal.

Further, while, in the first embodiment, a video signal for the left eye is provided for an odd field and a video signal for the right eye is provided for an even field, this arrangement may be changed such that a video signal for the right eye is provided for an odd field and a video signal for the left eye is provided for an even field.

In addition, in the first embodiment, the EVF 3 serving as a monitor on the side of the camera body 2 has a single image screen. Since right and left parallactic images are alternately displayed in a time-serial manner as the video signal, the right and left parallactic images are viewed as a double image on the EVF 3, which has no stereoscopic display function. This may be avoided by causing the right and left parallactic images included in the time-divisional video signal to be displayed on the respective separate display parts. For example, the so-called HMD (head-mounted display) having such a function may be used for that purpose. Accordingly, the HMD may be used as the EVF 3. Further, if the EVF 3 is used only for monitoring an object image being picked up, the function of displaying only one of the right and left parallactic images may be added to the EVF 3.

Figure 6:
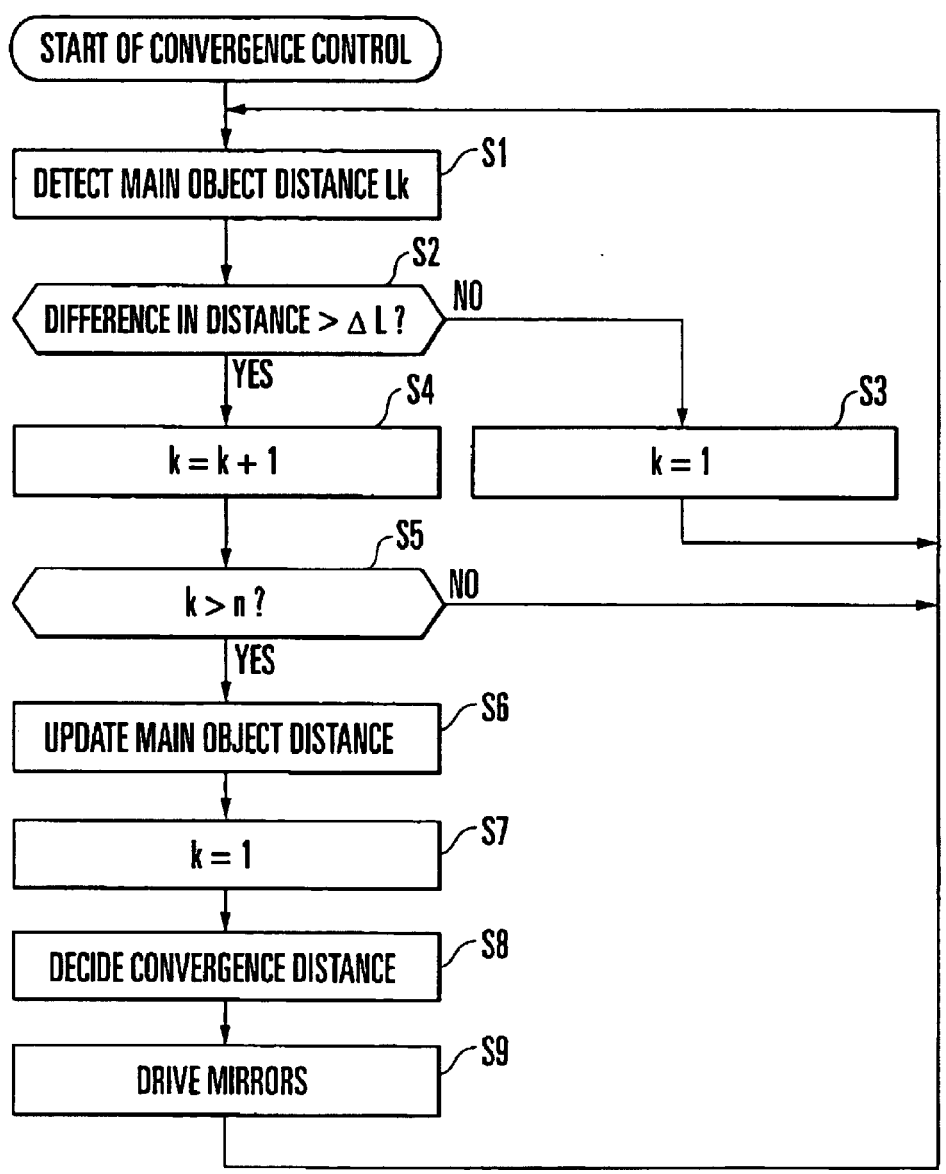
FIG. 6 is a flow chart showing the procedure for processing the convergence control in the first embodiment.

FIG. 6 is a flow chart showing the procedure for processing the convergence control. A program for this procedure is stored in the ROM 152 disposed within the lens microcomputer 127 and is executed by the CPU 151 disposed also within the lens microcomputer 127.

When starting the convergence control, first, in order to remove adverse influence such as noise, the lens microcomputer 127 performs the following processing in such a way as to decide the convergence distance for the mirrors 107 and 112 only when the variation of the object distance exceeds a predetermined value and continues for more than a predetermined period of time.

Referring to FIG. 6, in step S1, the main object distance Lk is detected by the distance measuring unit 8. In step 52, a check is made to find if the absolute value of a difference between the main object distance Lk as detected and the main object distance Lref as updated in the preceding time is greater than a predetermined value ΔL. Here, the predetermined value ΔL is a value indicative of a range of object distances at which the current convergence state can bring about the fusion of images naturally.

If the absolute value of a difference between the main object distances Lk and Lref is not greater than the predetermined value ΔL, i.e., if the variation of the main object distance as detected is small, a value "k" of the counter 156 disposed within the lens microcomputer 127 is reset to "1" in step S3. Then, the flow returns to the process of step S1. Here, the value "k" of the counter 156 is used for measuring a period of time for which the large variation of the main object distance continues.

On the other hand, if the absolute value of a difference between the main object distances Lk and Lref is greater than the predetermined value AL, the value "k" of the counter 156 is increased by "1" in step S4. Then, in step S5, a check is made to find if the value "k" of the counter 156 has become greater than a predetermined value "n". Here, the predetermined value "In" is a value corresponding to a period of time set for removing the variation of the object distance due to noise or the like, and is, in the first embodiment, set to a multiple of the field frequency. If the value "k" of the counter 156 is not greater than the predetermined value "n", the flow returns to the process of step S1.

On the other hand, if the value "k" of the counter 156 is greater than the predetermined value "In", the flow proceeds to step S6. In step S6, the main object distance Lk as currently detected is updated to the main object distance Lref to be made reference to for the next time. Then, in step S7, the value "k" of the counter 156 is reset to "1".

After that, the convergence distance is decided in step S8. The details of the process for deciding the convergence distance are described later. Then, in step S9, the lens microcomputer 127 sends control signals to the drivers 10 and 12 until the angles of the mirrors 107 and 112 corresponding to the decided convergence distance are obtained, so that the drivers 10 and 12 drive the mirrors 107 and 112 in the directions of arrows 13 and 15, respectively. As a result, the optical axes 4 and 5 turn in the directions of arrows 14 and 16 to bring about the fusion of images. After that, the flow returns to the process of step S1.

Next, the process for deciding the convergence distance (i.e., for deciding a convergence position which is a point at which the optical axes of right and left optical systems composed of the mirrors 107 and 112, etc., approximately intersect) in step S8 is described below. In the first embodiment, there are provided a plurality of modes (modes 1, 2 and 3) for deciding the convergence distance (convergence position). In the mode 1, the convergence distance is set shorter than the main object distance, i.e., the convergence position is set closer to the camera side than the position of a main object to be subjected to a stereoscopic viewing. In the mode 2, the convergence distance is set equal to the main object distance, i.e., the convergence position is set at the position of the main object. In the mode 3, the convergence distance is set longer than the main object distance, i.e., the convergence position is set farther from the camera side than the position of the main object. By performing an image pickup operation in any one of the modes 1, 2 and 3, a stereoscopic sensation to be obtained at the time of observation for the main object of one and the same distance can be varied.

In the first embodiment, when the photographer inputs, at the mode changeover part 20, a numerical value normalized by a viewing distance to the display screen of a display apparatus, one of the modes 1, 2 and 3 is selected. Thus, when the numerical value is inputted, one of the modes 1, 2 and 3 is automatically selected.

Figure 7:
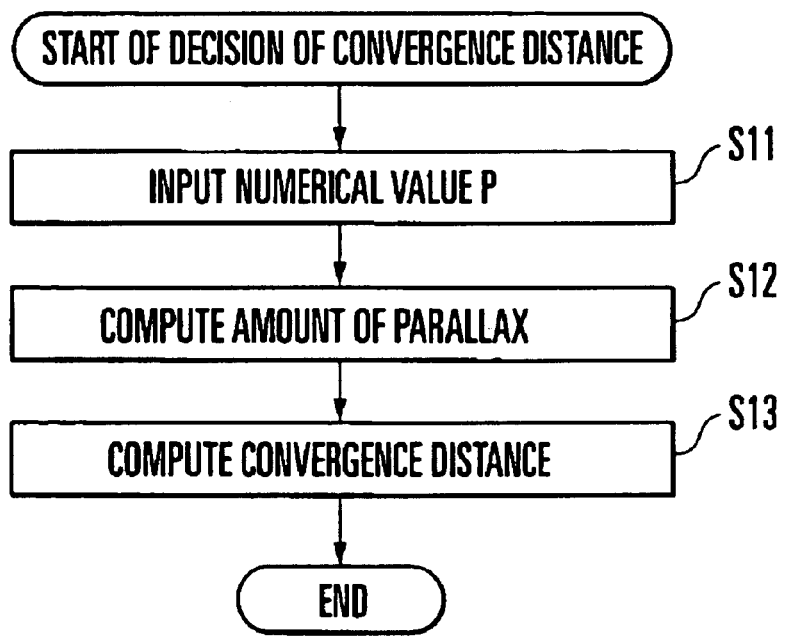
FIG. 7 is a flow chart showing the procedure for processing the decision of a convergence distance in step S8 shown in FIG. 6.

FIG. 7 is a flow chart showing the procedure for processing the decision of the convergence distance in step S8. A program for this procedure is stored in the ROM 152 disposed within the lens microcomputer 127 and is executed by the CPU 151 disposed also within the lens microcomputer 127. First, in step 511, a numerical value P normalized by a viewing distance to the display screen of a display apparatus is inputted from the mode changeover part 20 operated by the photographer. Here, the numerical value P is a value indicative of the ratio of a distance from the eyes of a person (observer) to a display image subjected to a stereoscopic viewing owing to the fusion of images to a distance from the display image subjected to a stereoscopic viewing to the display screen of the display apparatus. In the first embodiment, when the photographer operates a potentiometer-type graduated dial to set an index to a desired numerical value, a signal corresponding to the numerical value P is sent to the lens microcomputer 127. Subsequently, in step S12, an amount of parallax (an amount of deviation between right and left images) S(P) on the display screen of the display apparatus is computed. Where the pupil distance of a human being is represented by IPD, the amount of parallax S(P) can be obtained from the following equation (1). While, in the first embodiment, the pupil distance IPD is set to 63 mm, it is not a limited value and may be a value equivalent to the pupil distance of a human being.

$$S(P) = IPD \times P \qquad (1)$$

While, in the first embodiment, the amount of parallax S(P) is computed on the basis of the equation (1), such a modification may be employed that a numerical-value table representing amounts of parallax S(P) corresponding to the respective numerical values P is beforehand stored in the ROM 130 and, when a numerical value P is given, an amount of parallax S(P) is read out by making reference to the numerical-value table.

Then, in step S13, the convergence distance is computed by a geometric calculating operation using the amount of parallax S(P) obtained in step S12, the base length, the focal length of the lens, the image size of the image pickup part (CCD) 200, the screen size (display size) of the display screen, the detected object distance, and the amount of deviation from the optical axis of the position for detecting the object distance.

Here, the base length, the focal length and the image size are beforehand stored in the ROM 130, and are read out by the CPU 151 disposed within the lens microcomputer 127 in the process of step S13. The screen size may be inputted directly by the photographer or may be beforehand stored as data in the ROM 130. In a case where the photographer directly inputs the screen size, such an inputting operation may be performed by using a menu function within the electronic viewfinder (EVF) 3, a dial (not shown) or the like.

When the desired mode (the numerical value P in this case) has been inputted by the photographer according to a series of processes described above, the mirrors 107 and 112 are driven in such a way as to bring about the convergence distance corresponding to the inputted mode and the object distance, so that the optical axes 4 and 5 are made to intersect according to the convergence distance.

Incidentally, in accordance with the flow chart of FIG. 7, instead of computing the convergence distance corresponding to the mode and the object distance, such a modification may be employed that data indicative of convergence distances corresponding to the respective modes and the respective object distances are beforehand stored in the ROM 130 and, when the object distance is decided in step S6, the convergence distance corresponding to the decided object distance and the selected mode is read out from the ROM 130 and decided. In this case, it is possible for the photographer to select the mode by a manual operation using a dial or the like.

Further, while, in the first embodiment, the selection of modes is performed by the photographer inputting, at the mode changeover part 20, a numerical value normalized by the viewing distance to the display screen of the display apparatus, the numerical value to be inputted for the selection of modes is not limited to this value and may be another value as follows. Thus, the selection of modes is possible by inputting, at the mode changeover part 20 which is a mechanical type or an electronic type, at least one of parameters, such as the object distance L, a reciprocal 1/L of the object distance L, a numerical value normalized by the object distance L, a viewing distance to the display screen of the display apparatus, and a reciprocal of the viewing distance to the display screen of the display apparatus, in addition to a numerical value normalized by the viewing distance to the display screen of the display apparatus. Further, the manner of correlating these numerical values with the respective modes is not restricted.

As has been described above, in the stereoscopic video photographing apparatus according to the first embodiment, the convergence control is automatically performed, so that it is possible to pick up a stereoscopic video image having high definition and giving little fatigue while lightening the burden imposed on the photographer during photographing. Further, the photographer is allowed to set the controlling of a stereoscopic sensation, so that it is possible to reflect the intention of the photographer in the photographing operation.

Further, two lenses are not required, and one lens is used to pick up right and left parallactic images. By this arrangement, it is possible to realize the reduction in size and cost of the apparatus and to remove the adverse influence due to individual differences of right and left lenses, and it is possible to pick up a stereoscopic video image having high definition with the simple construction.

Further, since mirrors and liquid-crystal shutters are disposed symmetrically with respect to the optical axis of a lens, optical path lengths of right and left parallactic images to the object can be made equal to each other. By this arrangement, a difference in magnification between the right and left parallactic images can be removed, so that it is possible to pick up a stereoscopic video image having high definition.

Further, since right and left parallactic images can be picked up by one image sensor through the photographing optical system, any surplus electric circuit can be made unnecessary, so that it is possible to attain the reduction in size and cost of the apparatus.

Further, it is possible to provide, as one lens unit of the interchangeable lens system, a part of the stereoscopic video photographing apparatus according to the first embodiment. In other words, the camera body part does not need to have special parts for picking up a stereoscopic video image, and an ordinary lens unit for two-dimensional image pickup is usable with the same camera body part. Accordingly, the stereoscopic video photographing apparatus according to the first embodiment has high expandability and provides great advantages to the user. Further, a plurality of lens units for stereoscopic image pickup having different specifications in, for example, the focal length can be selectively used with the same camera body part.

In addition, it goes without saying that the invention is applied to a case where the object thereof is attained by supplying a program to the stereoscopic video photographing apparatus. In this case, a storage medium which stores therein a program represented by the software for attaining the object of the invention is read by the stereoscopic video photographing apparatus, so that the stereoscopic video photographing apparatus can enjoy the advantageous effects of the invention.

Figure 8B:
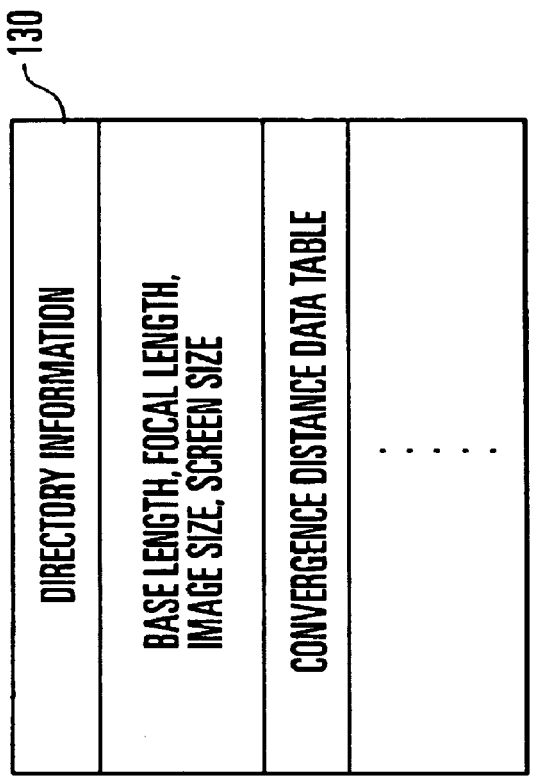
FIGS. 8(A) and 8(B) are diagrams showing memory maps of ROMs serving as storage media in the first embodiment.
Figure 8A:
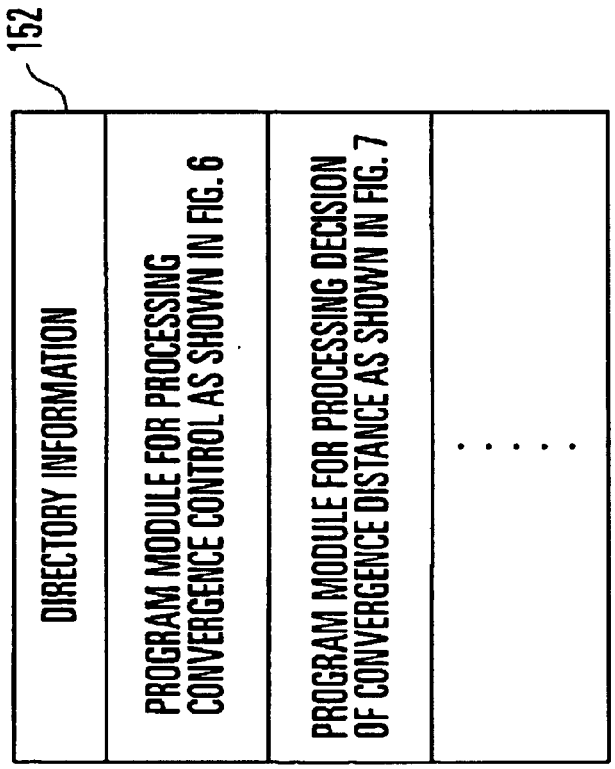

FIGS. 8(A) and 8(B) are diagrams showing memory maps of ROMs serving as storage media in the first embodiment. In the ROM 152 shown in FIG. 8(A), there are stored a program module for processing the convergence control shown in the flow chart of FIG. 6, a program module for processing the decision of the convergence distance shown in the flow chart of FIG. 7, etc. Further, in the ROM 130 shown in FIG. 8(B), there are stored the base length, the focal length, the image size of the image sensor, the screen size of the EVF, a table indicative of data of convergence distances corresponding to the respective modes and the respective object distances, etc. Here, the ROM 152 and the ROM 130 may be one and the same storage medium. Further, the storage medium for storing program modules is not limited to a ROM, and may be, for example, a floppy disk, a hard disk, a non-volatile memory card, or the like.

With the above-described construction employed, it is possible to provide a stereoscopic video photographing apparatus which is small in size, low in cost and excellent in mobility and expandability and is capable of picking up a high-definition stereoscopic video image.

Further, since the convergence control is automatically performed, it is possible to lighten the burden imposed on the photographer during photographing and to pick up a natural stereoscopic video image.

Further, since the photographer is enabled to set the controlling of a stereoscopic sensation, it is possible to reflect the intention of the photographer in an image pickup operation.

Next, a stereoscopic video photographing apparatus according to a second embodiment of the invention is described.

The construction of the stereoscopic video photographing apparatus according to the second embodiment is the same as the block diagram shown in FIG. 1, and the duplicate description is omitted herein. The characteristic feature of the second embodiment is that the respective distance measurement areas of an automatic focus adjusting means of the camera body 2 and an object-distance detecting part (distance measuring unit) 8 of the lens unit 1 are made to overlap each other, so that it is possible to naturally and automatically control the convergence distance.

Figure 9:
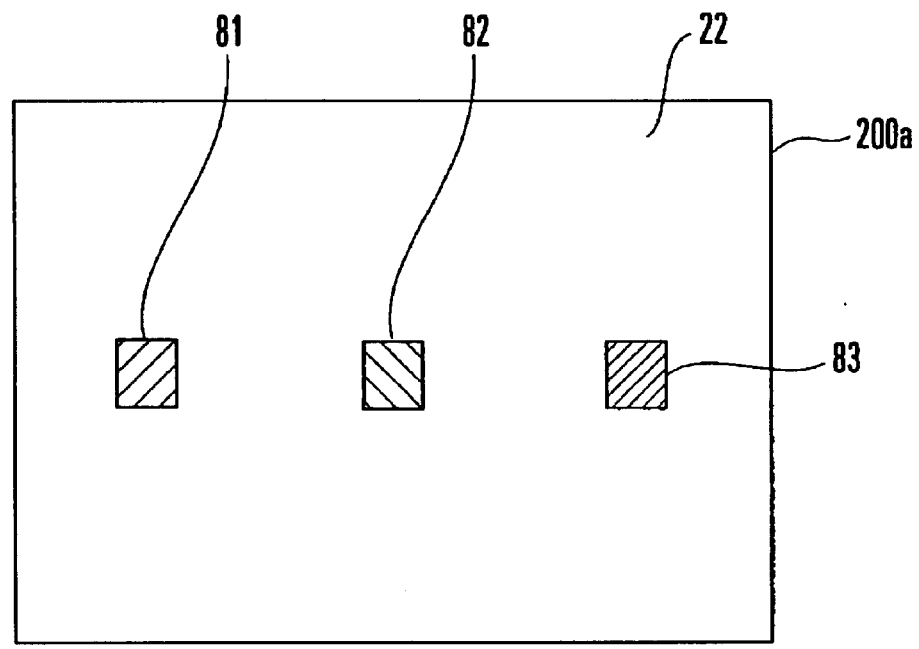
FIG. 9 is a diagram showing distance measurement areas set in a reading area of a CCD in a second embodiment of the invention.

FIG. 9 is a diagram showing distance measurement areas set in a reading area 22 of a CCD 200a serving as the image sensor 200. As shown in FIG. 9, the distance measurement areas 81, 82 and 83 for the object distance L to be detected by the distance measuring unit 8 are set at three portions, i.e., the left-side portion, the middle portion and the right-side portion, of the reading area 22 of the CCD 200a.

Referring to FIG. 1, electrical signals which have been respectively amplified to optimum levels by the amplifiers 204, 205 and 206 are converted into a television signal of the standard system by the camera signal processing circuit 207a. The television signal is externally outputted as a video signal, and, at the same time, is supplied to the AF signal processing circuit 207b. The AF signal processing circuit 207b forms an AF evaluation value signal by using the three original-color video signals supplied from the amplifiers 204, 205 and 206 and obtained from one or a plurality of distance measurement frames 23, 24 and 25 set in the reading area 22 of the CCD shown in FIG. 10. For example, the AF signal processing circuit 207b extracts and integrates high-frequency components of the video signals to obtain an AF evaluation signal, the level of which varies in accordance with the focusing state.

Figure 10:
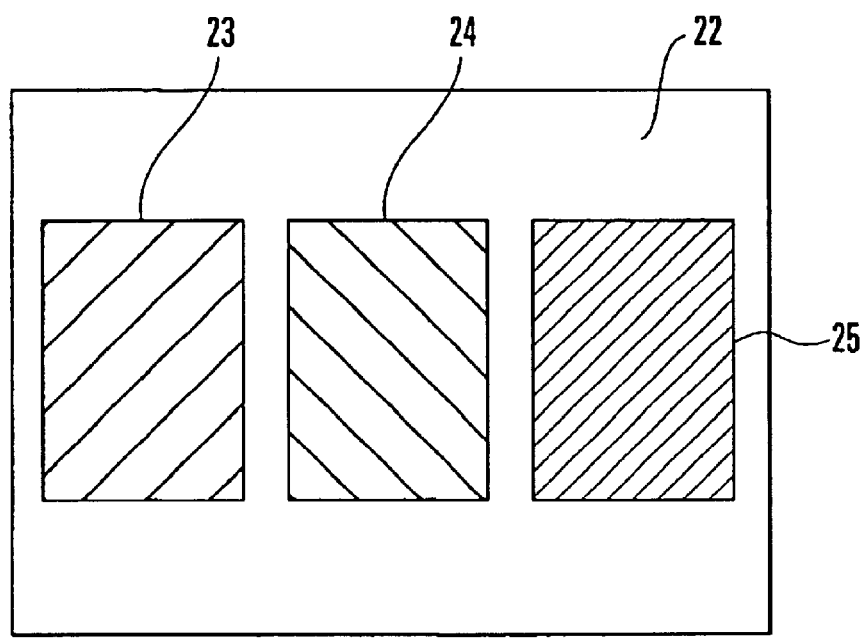
FIG. 10 is a diagram showing distance measurement frames for automatic focusing (AF) set in the reading area of the CCD in the second embodiment.

FIG. 10 is a diagram showing the distance measurement frames 23, 24 and 25 for automatic focusing (AF) set in the reading area 22 of the CCD. The distance measurement frames 23, 24 and 25 are set at three portions, i.e., the left-side portion, the middle portion and the right-side portion, of the reading area 22 of the CCD 200a. Incidentally, The position and size of each of the distance measurement frames are arbitrarily settable and may be freely set by the photographer. Further, while, in the second embodiment, there are three distance measurement frames, i.e., at the left-side portion, the middle portion and the right-side portion, in the reading area 22, four or more distance measurement frames may be provided. According to the second embodiment, the distance measurement areas 81, 82 and 83 for the object distance L to be detected by the distance measuring unit 8 are set in such a way as to be included within the distance measurement frames 23, 24 and 25, respectively.

Thus, according to the characteristic feature of the second embodiment, when the procedure for processing the convergence control is executed as shown in FIG. 6, in step S1, in which the main object distance Lk is detected by the distance measuring unit 8, the distance measurement areas for the main object distance are beforehand set to be respectively included within the distance measurement frames for the automatic focus control (AF).

Then, in step S2, a check is made to find if the absolute value of a difference between the main object distance Lk as detected and the main object distance Lref as updated in the preceding time is greater than a predetermined value ΔL, and the convergence control as described above is performed.

Subsequent processes are the same as those shown in FIG. 6, and the description of them is omitted here.

To sum up, only when the variation of the object distance exceeds the predetermined value ΔL and continues for more than a predetermined period of time, the convergence control is performed, so that it is possible to remove the variation of the object distance due to the adverse influence such as noise. Incidentally, the predetermined values ΔL and "n" may be adaptively set according to the lens system.

In addition, since the distance measurement areas 81, 82 and 83 of the distance measuring unit 8 are set to be respectively included within the distance measurement frames 23, 24 and 25 for the automatic focus control (AF) set in the reading area of the CCD 200a, it is possible to prevent the object located at the convergence distance from being out of focus, so that a good-quality video image can be obtained. Further, if a result of detection by the distance measuring unit 8 is utilized for the distance measurement in the distance measurement frames for the automatic focus control (AF), it becomes possible to obtain the high-accuracy AF performance.

As has been described above, since the convergence control is automatically performed, it is possible to pick up a stereoscopic video image having high definition and giving little fatigue while lightening the burden imposed on the photographer during photographing.

Further, the processing procedure according to the second embodiment also can be stored in the ROM 152 serving as a storage medium shown in FIG. 8(A), as the program module for processing the convergence control shown in FIG. 6.

With the above-described construction employed, it is possible to provide a stereoscopic video photographing apparatus which is small in size, low in cost and excellent in mobility and expandability and is capable of picking up a high-definition stereoscopic video image.

Further, since the convergence control is automatically performed, it is possible to lighten the burden imposed on the photographer during photographing and to pick up a natural stereoscopic video image.

Further, since the distance measurement areas of the distance measuring unit are set to be respectively included within the distance measurement frames for the automatic focus control (AF), it is possible to prevent the object located at the convergence distance from being out of focus, so that a good-quality video image can be obtained. Further, if a result of detection by the distance measuring unit is utilized for the distance measurement in the distance measurement frames for the automatic focus control (AF), it becomes possible to obtain the high-accuracy AF performance.

Next, a stereoscopic video photographing apparatus according to a third embodiment of the invention is described.

Figure 11:
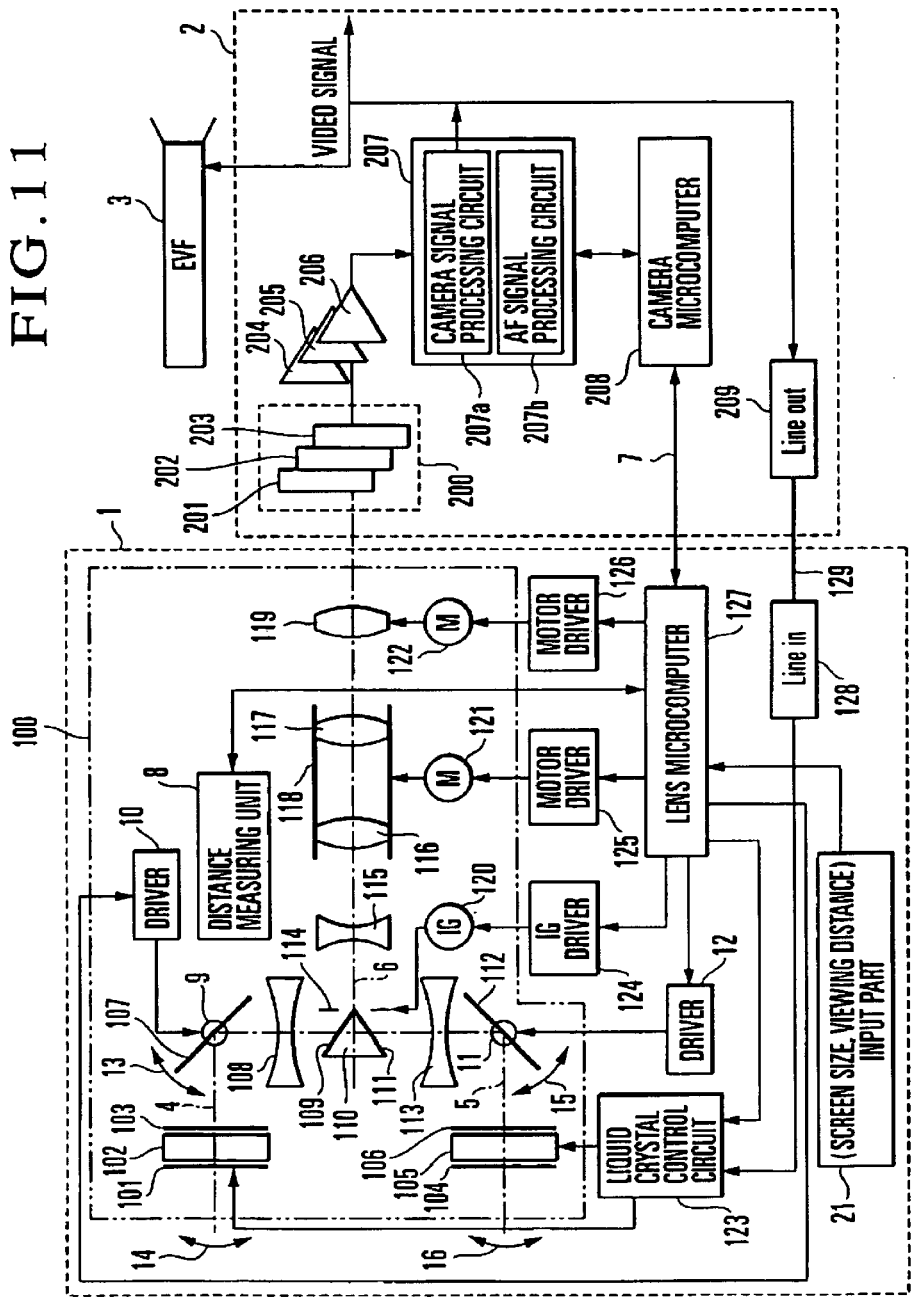
FIG. 11 is a block diagram showing the basic construction of a stereoscopic video photographing apparatus according to a third embodiment of the invention.

FIG. 11 is a block diagram showing the basic construction of the stereoscopic video photographing apparatus according to the third embodiment of the invention.

The construction shown in FIG. 11 differs from the block diagram of FIG. 1 in that there is provided a display information input part 21 for inputting, to the lens microcomputer 127 within the lens unit 1, information on the screen size of a display apparatus for displaying a stereoscopic video image and information on the distance from the eyes of the observer to the screen of the display apparatus.

By this arrangement, it becomes possible to perform the optimum convergence control for the display apparatus.

Specifically describing, in the process for deciding the convergence distance in step S8 in the flow chart of FIG. 6 showing the above-described convergence control, the optimum convergence control is performed on the basis of information about the display apparatus.

Figure 12:
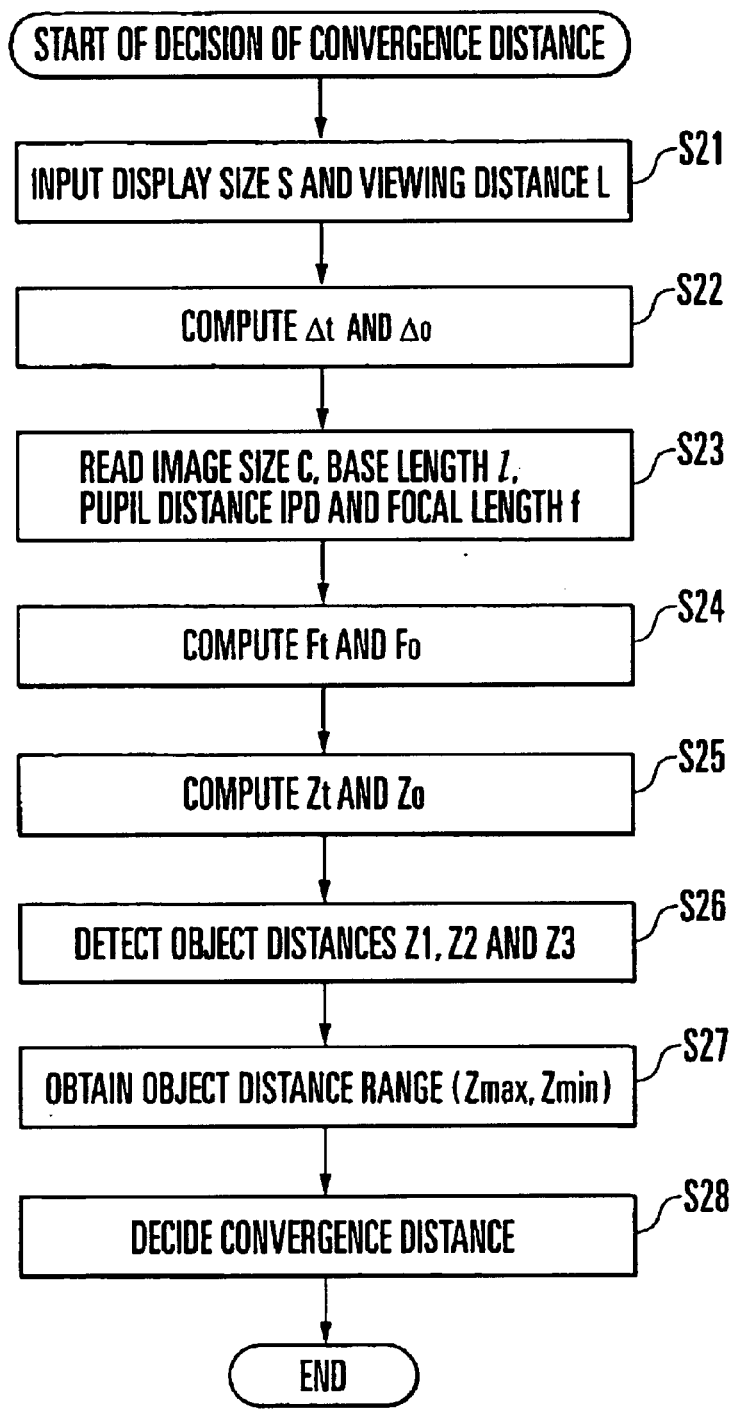
FIG. 12 is a flow chart for explaining the convergence control processing according to the third embodiment.

Thus, the process in step S8 in the flow chart of FIG. 6 is made as shown in the flow chart of FIG. 12.

FIG. 12 is a flow chart showing the procedure for processing the decision of the convergence distance according to the third embodiment, which corresponds to the process in step S8 in the flow chart of FIG. 6. First, in step S21, the input part 21 is operated by the photographer to input the screen (display) size S of a display apparatus for displaying a picked-up stereoscopic video image, and a viewing distance L from the approximate position of the eyes of the observer to the screen of the display apparatus. In the third embodiment, a menu picture is displayed on the EVF 3 in response to the operation of an electronic-type switch, and the screen size and the viewing distance are inputted on the menu picture or are selected from numerical values displayed on the menu picture. Then, information on the screen size and the viewing distance as determined is sent to the lens microcomputer 127. Incidentally, this inputting method is not a limited one, and the screen size and the viewing distance may be inputted in any way, including the direct input of numerical values.

In step 522, limit values Δt and Δo of an allowable range (allowable viewing range) in which a stereoscopic viewing is possible, i.e., the fusion of images is possible, with respect to the inputted viewing distance L are computed. The limit values Δt and Δo of the allowable range are obtained from the following equations (2) and (3), respectively:

$$\Delta t = C1 \times (1/L) + C2 \qquad (2)$$

$$\Delta o = C3 \times (1/L) + C4 \qquad (3)$$

where C1, C2, C3 and C4 are predetermined constants.

Incidentally, instead of the computation using the equations (2) and (3), such a modification may be employed that a table indicative of allowable ranges (allowable viewing ranges) with respect to the respective viewing distances L is beforehand stored in the ROM 152 and, when a particular viewing distance L is inputted, the limit values Δt and Δo are read out from the table.

In step S23, the image size C of the image sensor, the base length (the interval between optical axes of parallactic images) "l" and the pupil distance IPD of a human being are read from the ROM 152, and the current focal length "f" of the lens is obtained from zoom information.

Here, limit values Ft and Fo of an allowable image-fusion range in which a stereoscopic viewing is naturally possible for a human being can be obtained by the geometric computation from the screen size S, the viewing distance L, the image size C, the base length "l" and the focal length "f". More specifically, when the limit values Δt and Δo of the allowable range are obtained in step S2, the amount of parallax of right and left images on the display screen is obtained. Then, in step S24, the limit values Ft and Fo of the allowable image-fusion range are obtained by the following equations (4) and (5) in such a way as to realize the obtained amount of parallax:

$$Ft = C \times (IPD - \Delta t \times L)/C5 \times l \times S \times f \qquad (4)$$

$$Fo = C \times (IPD - \Delta o \times L)/C5 \times l \times S \times f \qquad (5)$$

where C5 is a predetermined constant.

In step S25, limit distances Zt and Zo of an allowable shooting range (photographable range) with respect to the convergence distance Y are obtained by the following equations (6) and (7) from the limit values Ft and Fo of the allowable image-fusion range:

$$1/Zt = 1/Y - Ft \qquad (6)$$

$$1/Zo = 1/Y - Fo \qquad (7)$$

where Zt is the limit distance shorter than the convergence distance Y, and Zo is the limit distance longer than the convergence distance Y.

Subsequently, in step S26, object distances Z1, Z2 and Z3 are detected by the distance measuring unit 8.

In the next step S27, an object distance range (Zmin, Zmax) is obtained from the detected object distances Z1, Z2 and Z3. The limit distance Zmin is a distance on the side closer to the camera side, and the limit distance Zmax is a distance on the side farther from the camera side.

Then, in step S28, by comparing the limit distances Zt and Zo of the photographable range with the limit distances Zmin and Zmax of the object distance range, such a convergence distance Y as to cause the object distance range (Zmin, Zmax) to be included within the photographable range (Zt, Zo) is obtained. According to the third embodiment, in a case where the object distance range (Zmin, Zmax) is smaller than or equal to the photographable range (Zt, Zo), the convergence distance Y is determined in such a way as to cause the object distance range (Zmin, Zmax) to be located at the middle of the photographable range (Zt, Zo).

Further, in a case where the object distance range (Zmin, Zmax) is larger than the photographable range (Zt, Zo), the convergence distance is set equal to the object distance obtained in the middle of the image plane. However, this setting is not a limited one, and the convergence distance Y may be determined in such a way as to cause the photographable range (Zt, Zo) to be located at the middle of the object distance range (Zmin, Zmax). In addition, the convergence distance Y may be determined in such a way as to make the object distance Zmin and the closer-side distance Zt of the photographable range equal to each other, or the convergence distance Y may be determined in such a way as to make the object distance Zmax and the farther-side distance Zo of the photographable range equal to each other.

With the above-described series of processes performed, when the photographer inputs the screen size and the viewing distance, the optimum convergence distance can be decided according to such an observing condition. As has been described above, since the convergence control is automatically performed, it is possible to pick up a stereoscopic video image having high definition and giving little fatigue while lightening the burden imposed on the photographer during photographing.

In addition, according to the third embodiment, it goes without saying that the invention is applied to a case where the object thereof is attained by supplying a program to the stereoscopic video photographing apparatus. In this case, a storage medium which stores therein a program represented by the software for attaining the object of the invention is read by the stereoscopic video photographing apparatus, so that the stereoscopic video photographing apparatus can enjoy the advantageous effects of the invention.

Figure 13:
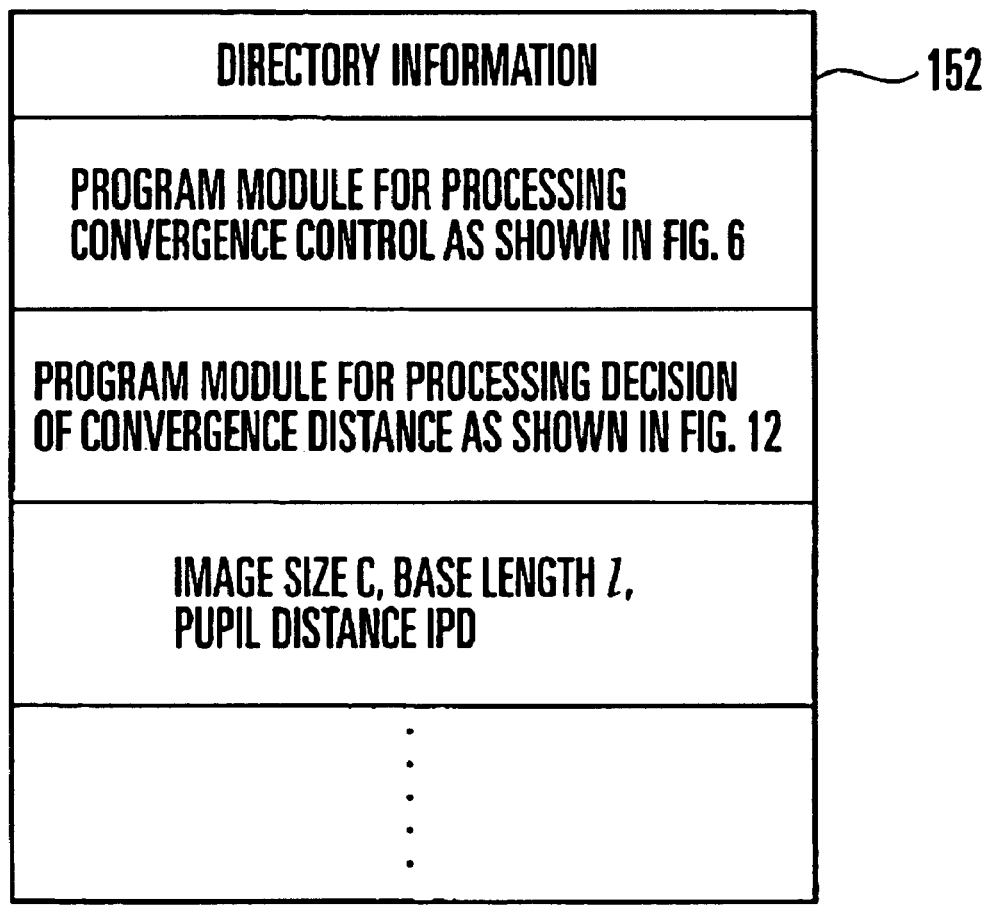
FIG. 13 is a diagram showing a memory map of a ROM having stored therein a program for executing the convergence control processing in the third embodiment.

FIG. 13 is a diagram showing a memory map of the ROM 152 serving as a storage medium in the third embodiment. In the ROM 152 shown in FIG. 13, there are stored a program module for processing the convergence control shown in the flow chart of FIG. 6, a program module for processing the decision of the convergence distance shown in the flow chart of FIG. 12, the image size C, the base length "l", the pupil distance IPD, etc. Further, the storage medium for storing program modules is not limited to a ROM, and may be, for example, a floppy disk, a hard disk, a non-volatile memory card, or the like.

Next, a stereoscopic video photographing apparatus according to a fourth embodiment of the invention is described.

As mentioned in the foregoing, there is a twin-lens type stereoscopic camera, such as that disclosed in Japanese Patent Publication No. Hei 8-27499, as a photographing apparatus for picking up a stereoscopic video image.

In addition, in Japanese Laid-Open Patent Application No. Hei 7-274214, there has been proposed a stereoscopic video camera of the simplified type in which an optical-type adapter is mounted on the camera body so as to enable a single image sensor to pick up a stereoscopic image with parallax. This stereoscopic video camera is provided with a detection means for detecting the attachment/detachment of the optical-type adapter, and a changeover means for changing over the operation mode of a signal processing circuit according to the output of the detection means. When the optical-type adapter is detached from the video camera body, the detection means detects the detachment of the optical-type adapter, and the signal processing circuit and a display circuit for the viewfinder are made to operate in the two-dimensional photographing mode.

While the problems of the conventional twin-lens type stereoscopic camera have been mentioned in the foregoing, the stereoscopic video camera proposed in Japanese Laid-Open Patent Application No. Hei 7-274214 has also the following problem. The stereoscopic video camera is set to the three-dimensional photographing mode when the optical-type adapter is mounted on the camera body, and the stereoscopic video camera is set to the two-dimensional photographing mode when the optical-type adapter is detached from the camera body. When the mode of the stereoscopic video camera is changed over from the two-dimensional photographing mode to the three-dimensional photographing mode, it is necessary to temporarily suspend the photographing operation, or it is necessary to attach the optical-type adapter to the camera body during the process of the photographing operation. In the latter case, a problem arises in that an image of the optical-type adapter would be recorded together with a picked-up video image.

It is, therefore, an object of the fourth embodiment to provide a stereoscopic video photographing apparatus or an optical apparatus capable of rapidly changing over from the two-dimensional photographing mode to the two-dimensional photographing mode.

Figure 14:
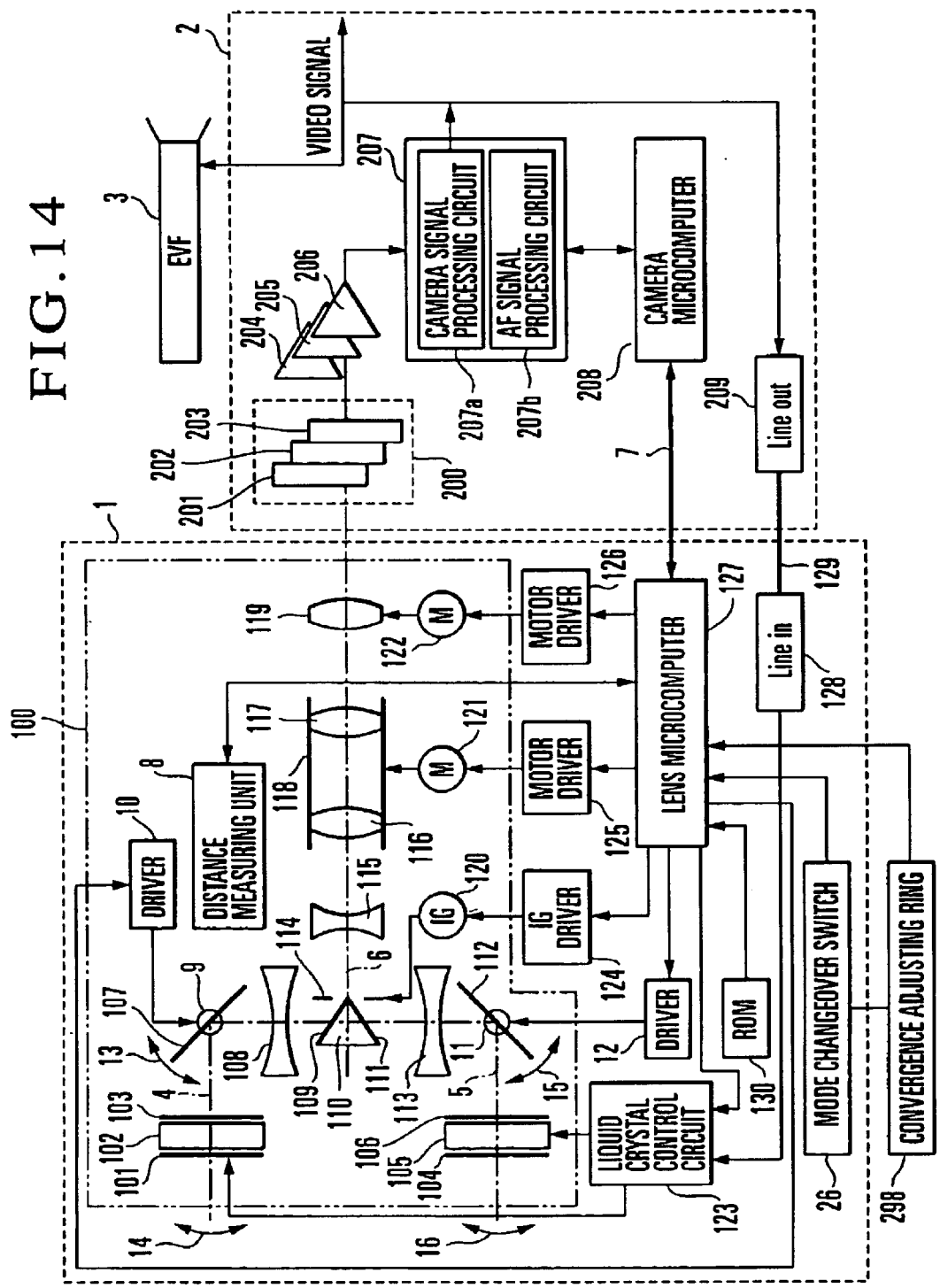
FIG. 14 is a block diagram showing the basic construction of a stereoscopic video photographing apparatus according to a fourth embodiment of the invention.

FIG. 14 is a block diagram showing the basic construction of the stereoscopic video photographing apparatus according to the fourth embodiment of the invention. The construction shown in FIG. 14 differs from the block diagram of FIG. 1 in that, on the side of the lens unit 1, a mode changeover switch 26 is provided instead of the mode changeover part 20, and a convergence adjusting ring 298 for adjusting the convergence angle is additionally provided. Information on the operation of the convergence adjusting ring 298 is supplied to the lens microcomputer 127 so as to control the rotation of the mirrors 107 and 112 for the convergence control.

The other elements in the construction shown in FIG. 14 are the same as those shown in FIG. 1, and are denoted by the same reference numerals as in FIG. 1 and are omitted from the description here.

Figure 15B:
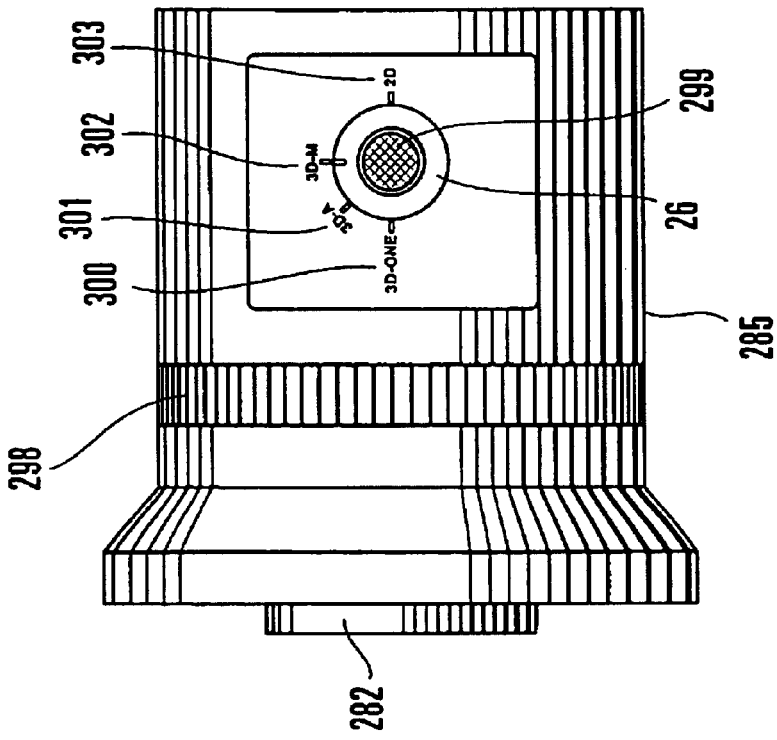
FIGS. 15(A) and 15(B) are diagrams showing the appearance of the stereoscopic video photographing apparatus according to the fourth embodiment.
Figure 15A:
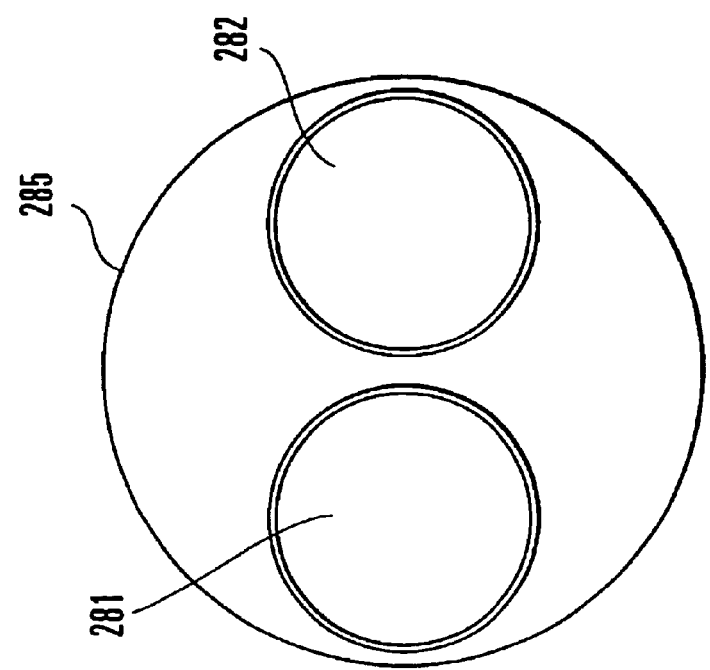

FIGS. 15(A) and 15(B) are diagrams showing the appearance of the stereoscopic video photographing apparatus according to the fourth embodiment. FIG. 15(A) shows a stereoscopic video photographing apparatus body 285 as viewed from lens windows 281 and 282, and FIG. 15(B) shows the stereoscopic video photographing apparatus body 285 as viewed from the side surface thereof.

The stereoscopic video photographing apparatus body 285 is provided with the convergence adjusting ring 298, which is operable for arbitrarily adjusting the convergence angle. The mode changeover switch 26 is provided in the rear of the convergence adjusting ring 298 on the side surface of the stereoscopic video photographing apparatus body 285. The mode changeover switch 26 is changeable among a three-dimensional photographing one-shot position (3D-ONE) 300, a three-dimensional photographing automatic tracking position (3D-A) 301, a three-dimensional photographing manual position (3D-M) 302, and a two-dimensional photographing position (2D) 303.

The three-dimensional photographing one-shot position (3D-ONE) 300 is interlocked with a 3D one-shot distance measuring switch 299 and the convergence adjusting ring 298. The three-dimensional photographing one-shot operation is performed in the following procedure. The photographer sets the mode changeover switch 26 to the three-dimensional photographing one-shot position 300, and, when finding a scene to be picked up with the three-dimensional photographing operation while observing an object through the viewfinder, the photographer operates the 3D one-shot distance measuring switch 299. In response to the operation of the 3D one-shot distance measuring switch 299, the distance measuring unit 8 functions to measure the object distance, so that the convergence position (angle) is controlled on the basis of the detected object distance. Then, if, after the control of the convergence position, the photographer judges that it is necessary to finely adjust the convergence angle, the photographer rotates the convergence adjusting ring 298 to finely adjust the convergence angle.

The three-dimensional photographing automatic tracking position (3D-A) 301 corresponds to a mode for controlling the convergence angle according the object distance on the basis of distance information obtained by the distance measuring unit 8. The three-dimensional photographing manual position (3D-M) 302 corresponds to a mode for allowing the photographer to adjust the convergence adjusting ring 298 so as to set an arbitrary convergence angle. The two-dimensional photographing position (2D) 303 corresponds to a mode for bringing one of the right and left liquid crystal shutters (liquid crystal elements) 102 and 105 into a transmissive state and the other into a non-transmissive state and bringing the optical axes 4, 5 and 6 (see FIG. 14) into a parallel state within one and the same plane.

Incidentally, while, in the fourth embodiment, a rotary-dial-type switch is used as the mode changeover switch 26, a slide-type switch may be used, or a key switch for selecting the content displayed on a touch panel stuck to a liquid crystal panel may be used. Further, such a modification may be employed that the respective mode names are displayed on the screen of the EVF 3 and the visual-line detection is used for the changeover of modes, so that it is possible for the photographer to change over the mode while viewing a picked-up video image.

Figure 16A:
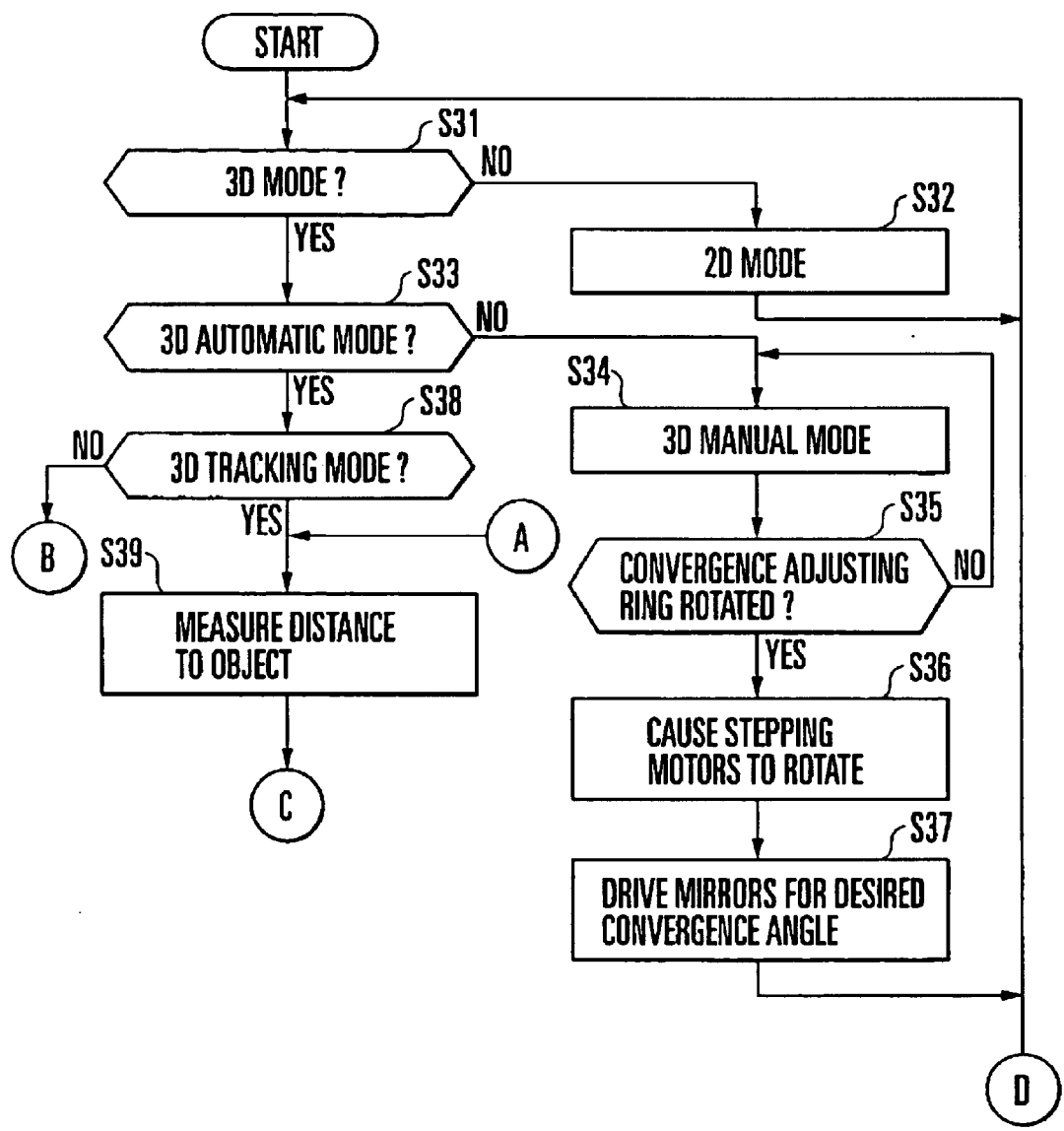
FIGS. 16(A) and 16(B) are flow charts showing the procedure for processing the convergence control in the fourth embodiment.
Figure 16B:
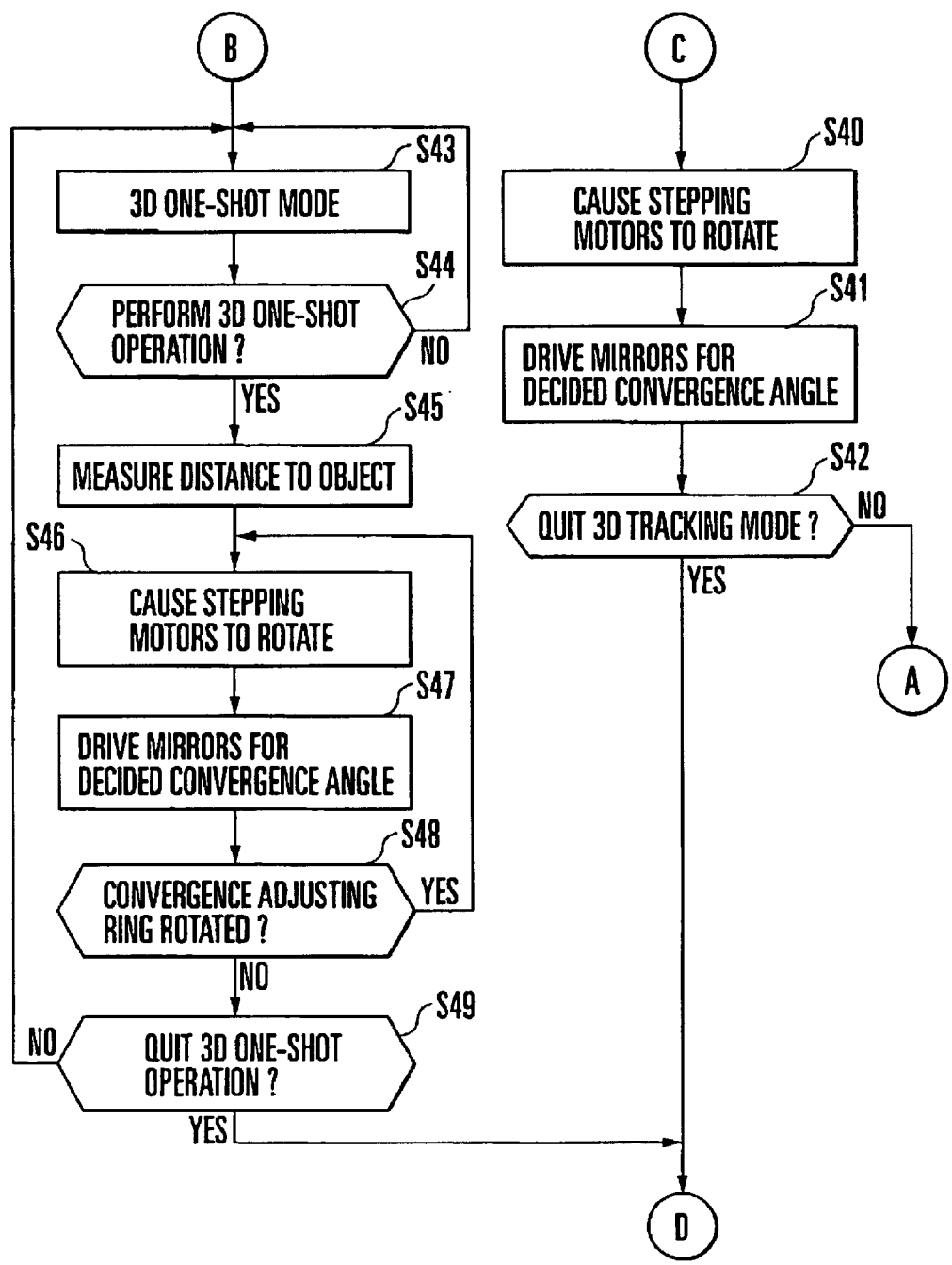

FIGS. 16(A) and 16(B) are flow charts showing the procedure for processing the convergence control according to the fourth embodiment. A program for this procedure is stored in the ROM 152 disposed within the lens microcomputer 127 and is executed by the CPU 151 disposed also within the lens microcomputer 127.

At the time of start of this processing operation, the mode of the stereoscopic video photographing apparatus is set to a photographing standby state in response to a command from the camera microcomputer 208. Then, with the processing operation started, in step S31, a check is made to find if the changeover switch 26 is operated to select the two-dimensional photographing mode or the three-dimensional photographing mode. If the photographing mode as selected is the two-dimensional photographing mode, the flow proceeds to step S32, where the photographing mode is set to the two-dimensional photographing mode. Then, the flow returns to the process of step S31.

On the other hand, if, in step s31, the photographing mode as selected is the three-dimensional photographing mode, the flow proceeds to step S33. In step S33, a check is made to find if the photographing mode as selected is the three-dimensional automatic mode. If not, the flow proceeds to step S34, where the photographing mode is set to the three-dimensional photographing manual mode. In the next step S35, a check is made to find if the convergence adjusting ring 298 has been rotated to adjust the convergence angle. If not, the flow returns to the process of step S34. If the convergence adjusting ring 298 has been rotated, the flow proceeds to step S36. In step S36 and step S37, the stepping motors 9 and 11 are rotated and stopped in accordance with driving signals from the drivers 10 and 12 which have received control signals from the lens microcomputer 127, so that the mirrors 107 and 112 are caused to turn so as to set the convergence angle to the desired one. After that, the flow returns to the process of step S31.

On the other hand, if, in step S33, the photographing mode as selected is the three-dimensional automatic mode, the flow proceeds to step S38. In step S38, a check is made to find if the photographing mode as selected is the three-dimensional photographing automatic tracking mode. If so, the flow proceeds to step 539, where the distance to the object is measured by the distance measuring unit 8. In the next step S40 and S41, the stepping motors 9 and 11 are rotated and stopped in accordance with driving signals from the drivers 10 and 12 which have received control signals from the lens microcomputer 127 on the basis of the object distance as detected, so that the mirrors 107 and 112 are caused to turn so as to set the convergence angle to the decided one. In this instance, in order to prevent the observer from having unpleasant feeling due to the change of a stereoscopic sensation caused by the change of the convergence angle, it is desirable to make the rotation speed of the stepping motors 9 and 11 sufficiently slow.

Then, in step S42, a check is made to find whether to quit the three-dimensional photographing automatic tracking mode. If the three-dimensional photographing automatic tracking mode is to be continued, the flow returns to the process of step S39. On the other hand, if the three-dimensional photographing automatic tracking mode is to be quitted, the flow returns to the process of step S31.

On the other hand, if, in step S38, the photographing mode as selected is not the three-dimensional photographing automatic tracking mode, the flow proceeds to step S43. In step S43, the photographing mode is set to the three-dimensional photographing one-shot mode. Here, the three-dimensional photographing one-shot mode is a mode in which the photographing condition is set for a particular object, or in which the photographing condition as once automatically set is finely adjusted by a manual operation.

Then, in step S44, a check is made to find whether to perform the three-dimensional photographing one-shot operation. If the three-dimensional photographing one-shot operation is not to be performed, the flow returns to the process of step S43. If the three-dimensional photographing one-shot operation is to be performed, the flow proceeds to step S45. In step S45, the distance to the object is measured by the distance measuring unit 8. In the next step S46 and step S47, the stepping motors 9 and 11 are rotated and stopped in accordance with driving signals from the drivers 10 and 12 which have received control signals from the lens microcomputer 127 on the basis of the object distance as detected, so that the mirrors 107 and 112 are caused to turn so as to set the convergence angle to the decided one.

Here, the three-dimensional photographing one-shot operation has such an advantage that it is possible to rapidly set the photographing condition adapted for a particular object to perform an adequate photographing operation. Accordingly, it is desirable to cause the stepping motors 9 and 11 in step S46 to rotate at a speed higher than the rotation speed in step S40.

After that, in step S48, a check is made to find if the convergence adjusting ring 298 has been rotated to adjust the convergence angle. If the convergence adjusting ring 298 has been rotated, the flow returns to the process of step S46. If the convergence adjusting ring 298 has not been rotated, the flow proceeds to step S49. In step S49, a check is made to find whether to quit the three-dimensional photographing one-shot operation. If the three-dimensional photographing one-shot operation is to be performed again, the flow returns to the process of step S43. If the three-dimensional photographing one-shot operation is to be quitted, the flow returns to the process of step S31.

With the series of processes executed as described above, it is possible to instantaneously change over between the two-dimensional photographing mode and the three-dimensional photographing mode by a simple operation. Accordingly, such a new photographing technique can be provided that, while a certain scene is being photographed in the two-dimensional photographing mode, when a main object comes into an angle of view, the photographing mode is changed over to the three-dimensional photographing mode without interrupting the photographing operation.

In the three-dimensional photographing automatic tracking mode, since the mirrors are driven always in association with the object distance, it becomes possible to pick up a high-definition stereoscopic video image. In the three-dimensional photographing one-shot mode, since the mirrors are driven only when the distance measuring switch is depressed, it is possible to provide a new photographing technique. In the three-dimensional photographing manual mode, it is possible for the photographer to arbitrarily set the convergence angle for the mirrors.

Further, it is possible to instantaneously change over between the two-dimensional photographing mode and the three-dimensional photographing mode by a simple operation. Accordingly, such a new photographing technique can be provided that, while a certain scene is being photographed in the two-dimensional photographing mode, when a main object comes into an angle of view, the photographing mode is changed over to the three-dimensional photographing mode without interrupting the photographing operation.

What is claimed is:

1. An image pickup apparatus, comprising:
    image pickup means for picking up an image of an object;
    an optical system arranged to cause the image to be formed on said image pickup means;
    a pair of shutters disposed symmetrically with respect to an optical axis of said optical system and arranged to time divisionally transmit right and left parallactic images of the object;
    a pair of mirrors disposed symmetrically with respect to the optical axis of said optical system and arranged to respectively reflect and lead to said optical system the right and left parallactic images transmitted by said pair of shutters;
    object-distance information detecting means for detecting an object distance indicative of a distance to the object;
    convergence distance deciding means for deciding, on the basis of the detected object distance, a convergence distance indicative of a distance to an intersection point of optical axes defined by said pair of mirrors; and
    driving means for driving said pair of mirrors in such a way as to attain the decided convergence distance;
    wherein said image pickup apparatus has a first mode in which the convergence distance is shorter than the object distance, a second mode in which the convergence distance is substantially equal to the object distance, and a third mode in which the convergence distance is longer than the object distance; and
    said convergence-distance deciding means decides the convergence distance on the basis of one of the first mode, the second mode and the third mode.

2. An image pickup apparatus according to claim 1, further comprising selection means for selecting one of the first mode, the second mode and the third mode by a manual operation of a photographer,
    wherein said convergence-distance deciding means decides the convergence distance on the basis of the mode selected by said selection means.

3. An image pickup apparatus according to claim 2, wherein said selection means selects one of the first mode, the second mode and the third mode by designating a numerical value.

4. An image pickup apparatus according to claim 3, further comprising display means for displaying the picked-up image,
    wherein the numerical value to be designated by said selection means is at least one of a numerical value normalized by a viewing distance to a display screen of said display means, an object distance, a reciprocal of the object distance, a numerical value normalized by the object distance, a viewing distance to the display screen of said display means, and a reciprocal of the viewing distance to the display screen of said display means.

5. An image pickup apparatus according to claim 4, further comprising storage means for storing, as data, a screen size of the display screen, a base length of said optical system, and image size of said image pickup means, and an amount of deviation from an optical axis of a position for detecting the object distance.

6. An image pickup apparatus according to claim 5, wherein the numerical value to be designated by said selection means is a numerical value normalized by a viewing distance to the display screen of said display means, and
    wherein said convergence-distance deciding means computes an amount of parallax on the display screen on the basis of the normalized numerical value and a pupil distance, and computes the convergence distance on the basis of the computed amount of parallax, the base length, the image size, the screen size, the object distance and the amount of deviation from the optical axis.

7. An image pickup apparatus according to claim 2, further comprising storage means for storing, as a table, data of convergence distances corresponding to the selected mode and the detected object distance.

8. An image pickup apparatus according to claim 1, wherein said image pickup apparatus is composed of an optical unit and a photographing unit which are attachable to and detachable from each other,
    said optical unit including said pair of shutters, said pair of mirrors, said optical system and said driving means, and
    said photographing unit including said image pickup means.

9. A convergence-distance deciding method for an image pickup apparatus having a camera for picking up an image of an object, an optical system arranged to cause the image to be formed on said camera, a pair of shutters disposed symmetrically with respect to an optical axis of said optical system and arranged to time-divisionally transmit right and left parallactic images of the object, a pair of mirrors disposed symmetrically with respect to the optical axis of said optical system and arranged to respectfully reflect and lead to said optical system the right and left parallactic images transmitted by said pair of shutters, and a distance measuring unit for detecting an object distance indicative of a distance to the object, and arranged to drive said pair of mirrors in such a way as to attain a decided convergence angle, said convergence-distance deciding method comprising:
- a step of detecting the object distance;
- a step of selecting, by a manual operation of a photographer, one of a first mode in which the convergence distance is shorter than the object distance, a second mode in which the convergence distance is equal to the object distance, and a third mode in which the convergence distance is longer than the object distance; and
- a step of deciding the convergence distance on the basis of the selected mode and the detected object distance.

10. A storage medium which stores therein a program to be executed by a computer for controlling an image pickup apparatus having a camera for picking up an image of an object, an optical system arranged to cause the image to be formed on said camera, a pair of shutters disposed symmetrically with respect to an optical axis of said optical system and arranged to time-divisionally transmit right and left parallactic images of the object, a pair of mirrors disposed symmetrically with respect to the optical axis of said optical system and arranged to respectively reflect and lead to said optical system the right and left parallactic images transmitted by said pair of shutters, and a distance measuring unit for detecting an object distance indicative of a distance to the object, and arranged to drive said pair of mirrors in such a way as to attain a decided convergence angle, said program comprising:
- a process of detecting the object distance;
- a process of selecting, by a manual operation of a photographer, one of a first mode in which the convergence distance is shorter than the object distance, a second mode in which the convergence distance is equal to the object distance, and a third mode in which the convergence distance is longer than the object distance; and
- a process of deciding the convergence distance on the basis of the selected mode and the detected object distance.

11. An optical apparatus, comprising:
- an optical system arranged to cause an image of an object to be formed on image pickup means;
- a pair of shutters disposed symmetrically with respect to an optical axis of said optical system and arranged to time-divisionally transmit right and left parallactic images of the object;
- a pair of mirrors disposed symmetrically with respect to the optical axis of said optical system and arranged to respectively reflect and lead to said optical system the right and left parallactic images transmitted by said pair of shutters;
- object-distance information detecting means for detecting an object distance indicative of a distance to the object;
- convergence-distance deciding means for deciding, on the basis of the detected object distance, a convergence distance indicative of a distance to an intersection point of optical axes defined by said pair of mirrors; and
- driving means for driving said pair of mirrors in such a way as to attain the decided convergence distance;
- wherein said optical apparatus has a first mode in which the convergence distance is shorter than the object distance, a second mode in which the convergence distance is substantially equal to the object distance, and a third mode in which the convergence distance is longer than the object distance; and said convergence-distance deciding means decides the convergence distance on the basis of one of the first mode, the second mode and the third mode.

12. An optical apparatus according to claim 11, further comprising selection means for selecting one of the first mode, the second mode and the third mode by a manual operation of a photographer,
wherein said convergence-distance deciding means decides the convergence distance on the basis of the mode selected by said selection means.

13. An optical apparatus according to claim 12, wherein said selection means selects one of the first mode, the second mode and the third mode by designating a numerical value.

14. An optical apparatus according to claim 13, further comprising display means for displaying the picked-u image,
wherein the numerical value to be designated by said selection means is at least one of a numerical value normalized by a viewing distance to a display screen of said display means, an object distance, a reciprocal of the object distance, a numerical value normalized by the object distance, a viewing distance to the display screen of said display means, and a reciprocal of the viewing distance to the display screen of said display means.

15. An optical apparatus according to claim 14, further comprising storage means for storing, as data, a screen size of the display screen, a base length of said optical system, an image size of said image pickup means, and an amount of deviation from an optical axis of a position for detecting the object distance.

16. An optical apparatus according to claim 15, wherein the numerical value to be designated by said selection means is a numerical value normalized by a viewing distance to the display screen of said display means, and
wherein said convergence-distance deciding means computes an amount of parallax on the display screen on the basis of the normalized numerical value and a pupil distance, and computes the convergence distance on the basis of the computed amount of parallax, the base length, the image size, the screen size, the object distance and the amount of deviation from the optical axis.

17. An optical apparatus according to claim 12, further comprising storage means for storing, as a table, data of convergence distances corresponding to the selected mode and detected object distance.

18. An image pickup apparatus comprising:
- image pickup means for picking up an image of an object;
- an optical system arranged to cause the image to be formed on said image pickup means;
- a pair of shutters diseased symmetrically with respect to an optical axis of said optical system and arranged to time-divisionally transmit right and left parallactic images of the object;
- a pair of mirrors disposed symmetrically with respect to the optical axis of said optical system and arranged to respectively reflect and lead to said optical system the right and left parallactic images transmitted by said pair of shutters;
- focus control means for performing automatic focus control of said optical system;
- distance-measurement-area setting means for setting, within a distance measurement frame for the automatic focus control, a distance measurement area for an object distance indicative of a distance to the object;

object-distance detecting means for detecting the object distance in the set distance measurement area;

convergence-distance deciding means for deciding, on the basis of the detected object distance, a convergence distance indicative of a distance to an intersection point of optical axes defined by said pair of mirrors;

driving means for driving said pair of mirrors in such a way as to attain the decided convergence distance; and distance-measurement-frame setting means for setting, within a reading area of said image pickup mesas, the distance measurement frame for the automatic focus control.

19. An image pickup apparatus according to claim 18, wherein the distance measurement frame for the automatic focus control is set at three portions, including a middle portion and portions on both sides thereof, of the reading area of said image pickup means, and the distance measurement area for the object distance is set within the distance measurement frame set at each of the three portions.

20. An image pickup apparatus, comprising:

image pickup means for picking up an image of an object;

an optical system arranged to cause the image to be formed on said image pickup means;

a pair of shutters disposed symmetrically with respect to an optical axis of said optical system and arranged to time-divisionally transmit right and left parallactic images of the object;

a pair of mirrors disposed symmetrically with respect to the optical axis of said optical system and arranged to respectively reflect and lead to said optical system the right and left parallactic images transmitted be said pair of shutters;

focus control means for performing automatic focus control of said optical system;

distance-measurement-area setting means for setting, within a distance measurement frame for the automatic focus control, a distance measurement area for an object distance indicative of a distance to the object;

object-distance detecting means for detecting the object distance in the set distance measurement area;

convergence-distance deciding means for deciding, on the basis of the detected object distance, a convergence distance indicative of a distance to an intersection point of optical axes defined by said pair of mirrors; and driving means for driving said pair of mirrors in such a way as to attain the decided convergence distance;

wherein said image pickup apparatus is composed of an optical unit and a photographing unit which are attachable to and detachable from each other;

said optical unit including said pair of shutters, said pair of mirrors, said optical system and said driving means; and said photographing unit including said image pickup means.

21. An image pickup apparatus comprising:

image pickup means for picking up an image of an object;

an optical system arranged to cause the image to be formed on said image pickup means;

a pair of shutters disposed symmetrically with respect to an optical axis of mid optical system and arranged to time-divisionally transmit right and left parallactic images of the object;

a pair of mirrors disposed symmetrically with respect to the optical axis of said optical system and arranged to respectively reflect and lead to said optical system the right and left parallactic images transmitted by said pair of shutters;

focus control means for performing automatic focus control of said optical system;

distance-measurement-area setting means for setting, within a distance measurement frame for the automatic focus control a distance measurement area for an object distance indicative of a distance to the object;

object-distance detecting means for detecting the object distance in the set distance measurement area;

convergence-distance deciding means for deciding, on the basis of the detected object distance, a convergence distance indicative of a distance to an intersection point of optical axes defined by said pair of mirrors; and driving means fat driving said pair of mirrors in such a way as to attain the decided convergence distance;

wherein said object-distance detecting means detects the object distance by using a trigonometric distance measurement principle.

22. A convergence distance deciding method for an image pickup apparatus having a camera for picking up an image of an object, an optical system arranged to cause the image to be formed on said camera, a pair of shutters disposed symmetrically with respect to an optical axis of said optical system and arranged to time-divisionally transmit right and left parallactic images of the object, a pair of mirrors disposed symmetrically with respect to the optical axis of said optical system and arranged to respectively reflect and lead to said optical system the right and left parallactic images transmitted by said pair of shutters, a focus control part for performing automatic focus control of said optical system, and a distance measuring unit for detecting an object distance indicative of a distance to the object, and arranged to drive said pair of mirrors in such a way as to attain a decided convergence angle, said convergence-distance deciding method comprising:

a step of setting, within a distance measurement frame for the automatic focus control, a distance measurement area for the object distance;

a step of detecting the object distance in the set distance measurement area; and a step of deciding, on the basis of the detected object distance, a convergence distance indicative of a distance to an intersection point of optical axes defied by said pair of mirrors;

wherein said deciding step decides the convergence distance on the basis of one of a first mode in which the convergence distance is shorter than the object distance, a second mode in which the convergence distance is substantially equal to the object distance, and a third mode in which the convergence distance is longer than the object distance.

23. A storage medium which stores therein a program to be executed by a computer for controlling an image pickup apparatus having a camera for picking up an image of an object, an optical system arranged to cause the image formed on said camera, a pair of shutters disposed symmetrically with respect to an optical axis of said optical system and arranged to time-divisionally transmit right and left parallactic images of the object, a pair of mirrors disposed symmetrically with respect to the optical axis of said optical system and arranged to respectively reflect and lead to said optical system the right and left parallactic images transmitted by said pair of shutters, a focus control part for performing automatic focus control of said optical system, and a distance measuring unit for detecting an object distance indicative of a distance to the object, and arranged to drive said pair of mirrors in such a way as to attain a decided convergence angle, said program comprising:
- a process of setting, within a distance measurement frame for the automatic focus control, a distance measurement area for the object distance;
- a process of detecting the object distance in the set distance measurement area; and
- a process of deciding, on the basis of the detected object distance, a convergence distance indicative of a distance to a intersection point of optical axes defined by said pair of mirrors,
- wherein said deciding process decides the convergence distance on the basis of one of a first mode in which the convergence distance is shorter than the object distance, a second mode in which the convergence distance is substantially equal to the object distance, and a third mode in which the convergence distance is toner than the object distance.

24. An optical apparatus, comprising:
- two shutters arranged to time-divisionally transmit right and left parallactic images alternately;
- an optical system arranged to cause the right and left parallactic images transmitted by said two shutters to be formed on an image pickup plane of image pickup means; and
- shutter control means for controlling said two shutters by generating driving signals synchronized with a period of formation of an image signal by said image pickup means;
- wherein said two shutters are right and left liquid crystal shutters for alternately transmitting and blocking the right and left parallactic images; and
- wherein said shutter control means is arranged to alternately open and close said right and left liquid crystal shutters in synchronism with a synchronizing signal of an image signal outputted from said image pickup means.

25. An optical apparatus according to claim 24, wherein said optical system is composed of four mirrors arranged to cause the right and left parallactic images transmitted by said two shutters to enter said image pickup plane, and a plurality of lens groups.

26. An optical apparatus according to claim 24, wherein said optical apparatus is a lens unit attachable to and detachable from a camera body through a mount part, said image pickup means being disposed at said camera body.

27. An optical apparatus according to claim 26, wherein said mount part has input means for inputting a video signal from said camera body, and said synchronizing signal is a vertical synchronizing signal extracted from the inputted video.

28. A camera apparatus, to and from which an optical apparatus is attachable and detachable, said optical apparatus comprising two shutters arranged to time-divisionally transmit right and left parallactic images alternately, an optical system arranged to cause the right and left parallactic images transmitted by said two shutters to be formed on an image pickup plane of image pickup means, and shutter control means for controlling said two shutters by generating driving signals synchronized with a period of formation of an image signal by said image pickup means, and said camera apparatus comprising said image pickup means, signal processing means for applying predetermined processing to right and left image signals corresponding to the right and left parallactic images outputted from said image pickup means and for outputting the processed image signals, and output means for transmitting to said optical apparatus a signal corresponding to a period of formation of an image signal by said image pickup means.

29. A camera system, comprising:
- a lens unit comprising two shutters arranged to time-divisionally transmit right and left parallactic images alternately an optical system answered to cause the right and left parallactic images transmitted by said two shutters to be formed on an image pickup plane of image pickup means, and shutter control means for controlling said two shutters by generating driving signal synchronized with a period of formation of an image signal by said image pickup means; and
- a camera body to and from which said lens unit is attachable and detachable, said camera body comprising said image pickup means, signal processing means for applying predetermined processing to right and left image signals corresponding to the right and left parallactic images outputted from said image pickup means and for outputting the processed image signals, and output means for transmitting to said lens unit a signal corresponding to a period of formation of an image signal by said image pickup means;
- wherein said two shutters age right and left liquid crystal shutters for alternately transmitting and blocking the right and left parallactic images, and wherein said shutter control means is arranged to alternately open and close said right and left liquid crystal shutters in synchronism with a synchronizing signal of an image signal outputted from said image pickup means.

30. A camera system according to claim 29, wherein said optical system is composed of four mirrors arranged to cause the right and left parallactic images transmitted by said two shutters to enter said image pickup plane, and a plurality of lens groups.

31. An optical apparatus, comprising:
- an optical system arranged to cause an image of an object to be formed on he pickup means;
- a pair of shutters disposed symmetrically with respect to an optical axis of said optical system and arranged to time-divisionally transmit right and left parallactic images of the object;
- a pair of mirrors disposed symmetrically with respect to the optical axis of said optical system and arranged to respectively reflect and lead to said optical system the right and left parallactic images transmitted by said pair of shutters;
- focus control means for performing automatic focus control of said optical system;
- distance-measurement area setting means for setting, within a distance measurement frame for the automatic focus control a distance measurement area for an object distance indicative of a distance to the object;
- object-distance detecting means for detecting the object distance in the set distance measurement area;
- convergence-distance deciding means for deciding, on the basis of the detected object distance, a convergence distance indicative of a distance to an intersection point of optical axes defined by said our of mirrors;
- driving means for driving said pair of mirrors in such a way as to attain the decided convergence distance; and
- distance-measurement-frame setting means for setting, within a reading area of said image pickup means, the distance measurement frame for the automatic focus control.

32. An optical apparatus according to claim 31, wherein the distance measurement frame for the automatic focus control is set at three portions, including a middle portion and portions on both sides thereof, of the reading area of said image pickup means, and the distance measurement area for the object distance is set within the distance measurement frame set at each of the three portions.

33. An optical apparatus, comprising:

an optical system arranged to cause an image of an object to be formed on image pickup means;

a pair of shutters disposed symmetrically with respect to an optical axis of said optical system and arranged to time-divisionally transmit right and left parallactic images of the object;

a pair of mirrors disposed symmetrically with respect to the optical axis of said optical system and arranged to respectively reflect and lead to said optical system the right and left parallactic images transmitted by said pair of shutters;

focus control means for performing automatic focus control of said optical system;

distance-measurement-area setting means for setting, within a distance measurement frame for the automatic focus control, a distance measurement area for an object distance indicative of a distance to the object;

object-distance detecting means for detecting the object distance in the set distance measurement area;

convergence-distance deciding means for deciding, on the basis of the detected object distance, a convergence distance indicative of a distance to an intersection point of optical axes defined by said pair of mirrors; and driving means for driving said pair of mirrors in such a way as to attain we decided convergence distance;

wherein said object distance detecting means detects the object distance by using a trigonometric distance measurement principle.

34. An image pickup apparatus comprising:

image pickup means for picking up an image of an object;

an optical system arranged to cause the image to be formed on said image pickup means;

a pair of shutters disposed symmetrically with respect to an optical axis of said optical system and arranged to time-divisionally transmit right and left parallactic images of the object;

a pair of mirrors disposed symmetrically with respect to the optical axis of said optical system and arranged to respectively reflect and lead to said optical system the right and left parallactic images transmitted by said pair of shutters;

display means for displaying the image picked up by said image pickup means;

input means for inputting information relating to said display means;

convergence-distance deciding means for deciding, on the basis of the inputted information, a convergence distance indicative of a distance to an intersection point of optical axes defined by said pair of mirrors; and driving means for driving said pair of mirrors in such a way as to attain the decided convergence distance;

wherein said image pickup apparatus is composed of an optical unit and a photographing unit which are attachable to and detachable from each other;

said optical unit including said pair of shutters, said pair of mirrors, said optical system and said driving means; and said photographing unit including said image pickup means and said display means.

35. An image pickup apparatus, comprising:

image pickup means for picking up an image of an object;

an optical system arranged to cause the image to be formed on said image pickup means;

a pair of shutters disposed symmetrically with respect to an optical axis of said optical stem and arranged to time-divisionally transmit right and left parallactic images of the object;

a pair of mirrors disposed symmetrically with respect to the optical axis of said optical system and arranged to respectively reflect and lead to said optical system the right and left parallactic images transmitted by said pair of shutters;

display means for displaying the image picked up by said image pickup means;

input means for inputting information relating to said display means:

convergence-distance deciding means for deciding, on the basis of the inputted information, a convergence distance indicative of a distance to an intersection point of optical axes defined by said pair of mirrors;

driving means for driving said pair of mirrors in such a way as to attain the decided convergence distance; and object-distance information detecting means for detecting an object distance indicative of a distance to the object;

wherein the information relating to said display means includes a screen size of said display means and a viewing distance from an approximate position of eyes of an observer to a display position of said display means; and wherein said convergence-distance deciding means includes computing means for computing a photographable range on the basis of the screen size, the viewing distance, a size of said image pickup means, a focal length of said optical system, an interval between optical axes of the right and left parallactic images, and a pupil distance of a human being, and decides the convergence distance on the basis of the computed photographable range and the detected object distance.

36. An image pickup apparatus according to claim 35, wherein said convergence-distance deciding means decides the convergence distance in such a way as to cause at least a part of the detected object distance to be included within the computed photographable range.

37. An image pickup apparatus, comprising:

image pickup means for picking up an image of an object;

an optical system arranged to cause the image to be formed on said image pickup means;

a pair of shutters disposed symmetrically with respect to an optical axis of said optical system and arranged to time-divisionally transmit right and left parallactic images of the object;

a pair of mirrors disposed symmetrically with respect to the optical axis of said optical system and arranged to respectively reflect and lead to said optical system the right and left parallactic images transmitted by said lair of shutters;

display means for displaying the image picked up by said image pickup means;

input means for inputting information relating to said display means;

convergence-distance deciding means for deciding, on the basis of the inputted information, a convenience distance indicative of a distance to an intersection point of optical axes defined by said lair of mirrors; and driving means for driving said pair of mirrors in such a way as to attain the decided convergence distance;

wherein said input means has a display screen and a switch for inputting information displayed on said display screen.

38. An image pickup apparatus according to claim 37, wherein a screen of said display means on which the image picked up by said image pickup means is displayed is used also as said display screen.

39. A convergence stance deciding method for an image pickup apparatus having a camera for picking up an image of an object, an optical system arranged to cause the image to be formed on said camera, a pair of shutters disposed symmetrically with respect to an optical axis of said optical system and arranged to time-divisionally transmit right and left parallactic images of the object, a pair of mirrors disposed symmetrically with respect to the optical axis of said optical system and arranged to respectively reflect and lead to said optical system the right and left parallactic images transmitted by said pair of shutters, a monitor for displaying the image picked up by said camera, and a distance measuring unit for detecting an object distance indicative of a distance to the object, and arranged to drive said pair of mirrors in such a way as to attain a decided convergence angle, said convergence-distance deciding method comprising:

a step of detecting the object distance;

a step of inputting, as information relating to said monitor, a screen size of said monitor and a viewing distance from an approximate position of eyes of an observer to a display position of said monitor;

a step of computing a photographable range on the basis of the screen size, the viewing distance, a size of an image pickup plane of said camera, a focal length of said optical system, an interval between optical axes of the right and left parallactic images, and a pupil distance of a human being; and a step of deciding the convergence distance on the basis of the computed photographable range and the detected object distance.

40. A storage medium which stores therein a program to be executed by a computer for controlling an image pickup apparatus having a camera for picking up an image of an object, an optical system arranged to cause the image to be formed on said camera, a pair of shutters disposed symmetrically with respect to an optical axis of said optical system and arranged to time-divisionally transmit right and left parallactic images of the object, a pair of mirrors disposed symmetrically with respect to the optical axis of said optical system and arranged to respectively reflect and lead to said optical system the right and left parallactic images transmitted by said pair of shutters, a monitor for displaying the image picked up by said camera, and a distance measuring unit for detecting and object distance indicative of a distance to the object, and arranged to drive said pair of mirrors in such a way as to attain a decided convergence angle, said program comprising:

a process of detecting the object distance;

a process of inputting, as information relating to said monitor, a screen size of said monitor and a viewing distance from an approximate position of eyes of an observer to a display position of said monitor;

a process of computing a photographable range on the basis of the screen size, the viewing distance, a size of an image pickup plane of said camera, a focal length of said optical system, an interval between optical axes of the right and left lactic images, and a pupil distance of a human being; and a process of deciding the convergence distance on the basis of the computed photographable range and the detected object distance.

41. An optical apparatus, comprising:

optical system arranged to cause an image of an object to be formed on image pickup means;

a pair of shutters disposed symmetrically with respect to an optical axis of said optical system and arranged to time-divisionally transmit nt and left parallactic images of the object;

a pair of mirrors disposed symmetrically with respect to the optical axis of said optical system and arranged to respectively reflect and lead to said optical system the right and left parallactic images transmitted by said pair of shutters;

display means for displaying the image picked up by said image pickup means;

input means for inputting information relating to said display means;

convergence-distance deciding means for deciding on the basis of the inputted information, a convergence distance indicative of a distance to an intersection point of optical axes defined by said pair of mirrors;

driving means for driving said pair of mirrors in such a way as to attain the decided convergence distance; and object-distance information detecting means for detecting an object distance indicative of a distance to the object;

wherein the information relating to said display means includes a screen size of said display means and a viewing distance from an approximate position of eyes of an observer to a display position of said display means, and wherein said convergence-distance deciding means includes computing means for computing a photographable range on the basis of the screen size, the viewing distance, a size of said image pickup means, a focal length of said optical system, an interval between optical axes of the right and left parallactic images, and a pupil distance of a human being, and decides the convergence distance on the basis of the computed photographable range and the detected object distance.

42. An optical apparatus according to claim 41, wherein said convergence-distance deciding means decides the convergence distance in such a way as to cause at least a part of the detected object distance to be included within the computed photographable range.

43. An optical apparatus, comprising:

an optical system arranged to cause an image of an object to be formed on image pickup means;

a pair of shutters disposed symmetrically with respect to an optical axis of said optical system and arranged to time-divisionally transmit right and left parallactic images of the object;

a pair of mirrors disposed metrically with respect to the optical axis of said optical system and arranged to respectively reflect and lead to said optical system the right and left parallactic images transmitted by said pair of shutters;

display means for displaying the image picked up by said image pickup means;

input means for inputting information relating to said display means;

convergence-distance deciding means for deciding, on the basis of the inputted information, a convergence distance indicative of a distance to an intersection point of optical axes defined by said pair of mirrors; and driving means for driving said pair of mirrors in such a way as to attain the decided convergence distance;

wherein said input means has a display se and a switch for inputting information displayed on said display screen.

44. An optical apparatus according to claim 43, wherein a screen of said display means on which the image picked up by said image pickup means is displayed is used also as said display screen.

45. An image pickup apparatus, comprising:

image pickup means for picking up an image of an object;

an optical system arranged to cause the image to be formed on said image pickup means;

a pair of shutters disposed symmetrically with respect to an optical axis of said optical system and arranged to time-divisionally transmit right and left parallactic images of the object;

a pair of mirrors disposed symmetrically with respect to the optical axis of said optical system and arranged to respectively reflect and lead to said optical system the right and left parallactic images transmitted by said pair of shutters;

object-distance detecting means for detecting an object distance indicative of a distance to the object;

driving means for driving said pair of mirrors in such a way as to attain a convergence distance corresponding to the detected object distance; and mode changeover means for changing over a mode of said image pickup apparatus between a three-dimensional photographing mode in which the right and left parallactic images reflected by said pair of mirrors arm picked up and a two-dimensional photographing mode in which only the image reflected by one of said pair of mirrors is picked up.

46. An image pickup apparatus according to claim 45, wherein said mode changeover means is a changeover switch operable by a photographer.

47. An image pickup apparatus according to claim 45, wherein the three-dimensional photographing mode includes an automatic tacking mode in which said pair of mirrors are driven in association with the object distance continuously detected by said object-distance detecting means, a one-shot mode in which said pair of mirrors are driven in association with the object distance detected by said object-distance detecting means only when a predetermined switch is depressed, and a manual mode in which said pair of mirrors are driven in association with a manual operation, and wherein said mode changeover means is able to change over three dimensional photographing mode to one of the automatic tracking mode, the one-shot mode and the manual mode.

48. An image pickup apparatus according to claim 45, wherein, in the two-dimensional photographing mode, respective optical axes of said pair of mirrors and an optical axis of said optical system are located within one and the same plane and are approximately parallel with one another.

49. An image pickup apparatus according to claim 47, wherein, during the automatic tracking mode, said driving means drives said pair of mirrors at a speed lower than during the one-shot mode.

50. A convergence control method for an image pickup apparatus having a camera for picking up an image of an object, an optical system arranged to cause the image to be formed on said camera, a pair of shutters disposed symmetrically with respect to an optical axis of said optical system and arranged to time-divisionally transmit right and left parallactic images of the object, a pair of mirrors disposed symmetrically with respect to the optical axis of said optical system and arranged to respectively reflect and lead to said optical system the right and left parallactic images transmitted by said pair of shutters, and a distance measuring unit for detecting an object distance indicative of a distance to the object, and arranged to drive said pair of mirrors in such a way as to attain a convergence distance corresponding to the detected object distance, said convergence control method comprising:

a step of changing over a mode of said image pickup apparatus between a three-dimensional photographing mode and a two-dimensional photographing mode;

a step of, when the mode of said image pickup apparatus has been changed over to the three-dimensional photographing mode, driving said pair of mirrors in such a way as to attain a convergence distance corresponding to the detected object distance, and picking up the right and left parallactic images reflected by said pair of mirrors; and a step of, when the mode of said image pickup apparatus has been changed over to the two-dimensional photographing mode, picking up only the image reflected by one of said pair of mirrors.

51. A storage medium which stores therein a program to be executed by a computer for controlling an image pickup apparatus having a camera for picking up an image of an object, an optical system arranged to cause the image to be formed on said camera, a pair of shutters disposed symmetrically with respect to an optical axis of said optical system and arranged to time-divisionally transmit right and left p-lactic images of the object, a pair of mirrors disposed symmetrically with respect to the optical axis of said optical system and arranged to respectively reflect and lead to said optical system the right and left parallactic images transmitted by said pair of shutters, and a distance measuring unit for detecting an object distance indicative of a distance to the object, and arranged to drive said pair of mirrors in such a way as to attain a convergence distance corresponding to the detected object distance, said program comprising:

a process of changing over a mode of said image pickup apparatus between a three-dimensional photographing mode and a two-dimensional photographing mode;

a process of, when the mode of said image pickup apparatus has been changed over to the three-dimensional photographing mode, driving said pair of mirrors in such a way as to attain a convergence distance corresponding to the detected object distance, and picking up the right and left parallactic images reflected by said pair of mirrors; and a process of, when the mode of said image pickup apparatus has been changed over to the two-dimensional photographing mode, picking up only the image reflected by one of said pair of mirrors.

52. An optical apparatus, comprising:

an optical system arranged to cause an image of an object to be formed on image pickup means;

a pair of shutters disposed symmetrically with respect to an optical axis of said optical system and arranged to time-divisionally transmit right and left parallactic images of the object;

a pair of mirrors disposed symmetrically with respect to the optical axis of said optical system and arranged to respectively reflect and lead to said optical system the right and left parallactic images transmitted by said pair of shutters;

object-distance detecting means for detecting an object distance indicative of a distance to the object;

driving means for driving said pair of mirrors in such a way as to attain a convergence distance corresponding to the detected object distance; and mode changeover means for changing over a mode of said optical apparatus between a three-dimensional photographing mode in which the right and left parallactic images reflected by said pair of mirrors are picked up and a two-dimensional photographing mode in which only the image reflected by one of said pair of mirrors is picked up.

53. An optical apparatus according to claim 52, wherein said mode changeover means is a changeover switch operable by a photographer.

54. An optical apparatus according to claim 52, wherein the three-dimensional photographing mode includes an automatic tracking mode in which said pair of mirrors are driven in association with the object distance continuously detected by said object-distance detecting means, a one-shot mode in which said pair of mirrors are driven in association with the object distance detected by said object-distance detecting means only when a predetermined switch is depressed, and a manual mode in which said pair of mirrors are driven in association with a manual operation, and wherein said mode changeover means is able to change over the three-dimensional photographing mode to one of the automatic tracking mode, the one-shot mode and the manual mode.

55. An optical apparatus according to claim 52, wherein, in the two-dimensional photographing mode, respective optical axes of said pair of mirrors and an optical axis of said optical system are located within one and the same plane and are approximately parallel with one another.

56. An optical apparatus according to claim 52, wherein, during the automatic tracking mode, said driving means drives said pair of mirrors at a speed lower than during the one-shot mode.

* * * * *

UNITED STATES PATENT AND TRADEMARK OFFICE
CERTIFICATE OF CORRECTION

PATENT NO. : 6,864,910 B1
APPLICATION NO. : 09/603606
DATED : March 8, 2005
INVENTOR(S) : Shigeru Ogino et al.

It is certified that error appears in the above-identified patent and that said Letters Patent is hereby corrected as shown below:

Column 9, line 66, delete "step 52" and insert --step S2--

Column 10, line 18, delete "AL" and insert --ΔL--

Column 10, line 23 and 30, delete "value "In" and insert --value n--

Column 11, line 23, delete "subsequently" and insert new paragraph --Subsequently--

Column 15, line 45, delete "step 58" and insert --step S8--

Column 15, line 66, delete "step 522" and insert --step S22--

Column 19, line 54, delete "s31" and insert --S31--

Column 20, line 10, delete "step 539" and insert --step S39--

Column 24, line 15, delete "picked-u" and insert --picked-up--

Column 25, line 11, delete "pickup mesas" and insert --pickup means--

Column 26, line 17, delete "means fat" and insert --means for--

Column 26, line 47, delete "are defied" and insert --are defined--

Column 28, line 39, delete "on he pickup" and insert --on image pickup--

Column 28, line 61, delete "said our" and insert --said pair--

Column 29, line 34, delete "attain we" and insert --attain the--

Column 30, line 59, delete "said lair" and insert --said pair--

Column 31, line 2, delete "said lair" and insert --said pair--

Column 32, line 3, delete "lactic images" and insert --parallactic images--

Column 32, line 13, delete "transmit nt" and insert --transmit right--

Column 33, line 9, delete "display se" and insert --display screen--

UNITED STATES PATENT AND TRADEMARK OFFICE
CERTIFICATE OF CORRECTION

PATENT NO.        : 6,864,910 B1
APPLICATION NO. : 09/603606
DATED             : March 8, 2005
INVENTOR(S)       : Shigeru Ogino et al.

It is certified that error appears in the above-identified patent and that said Letters Patent is hereby corrected as shown below:

Column 33, line 38, delete "mirrors arm" and insert --mirrors are--

Column 33, line 47, delete "tacking mode" and insert --tracking mode--

Column 34, line 37, delete "left p-lactic" and insert --left parallactic--

Signed and Sealed this

Fifteenth Day of May, 2007

JON W. DUDAS
*Director of the United States Patent and Trademark Office*